(12) United States Patent
Jones et al.

(10) Patent No.: US 6,699,302 B1
(45) Date of Patent: Mar. 2, 2004

(54) TREATMENT OF METAL SULPHIDE CONCENTRATES BY ROASTING AND ELECTRICALLY STABILIZED OPEN-ARC FURNACE SMELT REDUCTION

(75) Inventors: Rodney T Jones, Randburg (ZA); Nicholas A. Barcza, Randburg (ZA); Gary Kaiura, Toronto (CA); Gary O'Connell, Toronto (CA); Anthony Hannaford, Toronto (CA)

(73) Assignee: Mintek, Randburg (ZA)

( * ) Notice: Subject to any disclaimer, the term of this patent is extended or adjusted under 35 U.S.C. 154(b) by 0 days.

(21) Appl. No.: 09/914,313

(22) PCT Filed: Feb. 25, 2000

(86) PCT No.: PCT/ZA00/00032
§ 371 (c)(1),
(2), (4) Date: Nov. 29, 2001

(87) PCT Pub. No.: WO00/50652
PCT Pub. Date: Aug. 31, 2000

(30) Foreign Application Priority Data

Feb. 26, 1999 (ZA) .............................. 99/1285

(51) Int. Cl.⁷ .............................................. C22B 9/00
(52) U.S. Cl. ...................................... 75/10.32; 75/10.62
(58) Field of Search ......................... 75/420, 421–25, 75/10.62, 10.36, 658, 665, 631, 10.32

(56) References Cited

U.S. PATENT DOCUMENTS

| | | | |
|---|---|---|---|
| 2,261,946 A | * 11/1941 | Avery | ........................ 75/10.62 |
| 2,641,461 A | * 6/1953 | Lewis | ........................ 266/218 |
| 3,857,701 A | 12/1974 | Hunter et al. | |
| 4,138,231 A | * 2/1979 | Hedenas et al. | ............ 423/210 |
| 4,344,792 A | 8/1982 | O'Neill | |
| 4,588,436 A | * 5/1986 | Eriksson et al. | ........... 75/10.19 |
| 5,174,810 A | * 12/1992 | Dosaj et al. | ................. 75/10.5 |
| 5,188,658 A | 2/1993 | Aune et al. | |

FOREIGN PATENT DOCUMENTS

| | | |
|---|---|---|
| DE | 171880 C | 6/1906 |
| DE | 1144931 | 3/1963 |
| DE | 2605943 A1 | 8/1977 |
| EP | 0441052 A1 | 12/1999 |
| GB | 1290056 | 9/1972 |
| RU | 2121518 | 11/1998 |
| WO | WO 95/21945 | 8/1995 |
| WO | WO 97/00333 | 1/1997 |

OTHER PUBLICATIONS

Derwent Acc No. 1977–61319Y for DE 2605943 A published Aug. 25, 1977. Abstract.*

* cited by examiner

Primary Examiner—Melvyn Andrews
(74) Attorney, Agent, or Firm—Brinks Hofer Gilson & Lione

(57) ABSTRACT

A process for treating a metal sulphide concentrate which includes the steps of: a) roasting the concentrate to reduce the sulphide content of the concentrate, to a negligible value and b) melting the concentrate, under reducing conditions, in an electrically stabilized open-arc furnace, in particular a DC arc furnace.

19 Claims, 10 Drawing Sheets

TREATMENT OF METAL SULPHIDE CONCENTRATES BY ROASTING AND ELECTRICALLY STABILIZED OPEN-ARC FURNACE SMELT REDUCTION

This is a continuation application of International Application PCT/ZA00/00032 filed Feb. 25, 2000, which claims priority to South Africa 99/1285 filed Feb. 26, 1999.

BACKGROUND OF THE INVENTION

This invention relates to the treatment of metal sulphide concentrates.

PRIOR ART

Roasting for Sulphur Removal

Oxidative roasting of pyrite ($FeS_2$) is a standard way of producing sulphuric acid. Roasting is used on an industrial scale, e.g. for the production of zinc, copper, and nickel, even tin, molybdenum, and antimony and, in many cases, takes place in conjunction with one or more leaching or smelting operations. Sulphide roasting is used to oxidize some (or all) of the sulphur. The resulting $SO_2$ is treated further, most commonly producing sulphuric acid. Other options for recovery of sulphur include the production of elemental sulphur, or liquid $SO_2$.

Modem roasting processes usually use fluidized-bed reactors, which are energy-efficient, and have a high productivity because of their favourable kinetic reaction conditions. The $SO_2$ content in the off-gas is typically 8 to 15% by volume.

For pyrometallurgical processing, the usual purpose of roasting is to decrease the sulphur content to an optimum level for smelting to a matte. Partial (oxidizing) roasting is accomplished by controlling the access of air to the concentrate; a predetermined amount of sulphur is removed and, for example in the recovery of copper, only part of the iron sulphide is oxidized, leaving the copper sulphide (for example) relatively unchanged. Total, or dead, roasting involves the complete oxidation of all sulphides, usually for a subsequent reduction process.

There are many modem pyrometallurgical processes in which roasting is not a separate step, but is combined with matte smelting. Flash furnaces employ sulphide concentrate burners that both oxidize and melt the feed, and are used extensively in the copper industry. Autogenous bath smelting is another alternative. Here a lance blows air or oxygen, together with concentrates and reductant, into a molten bath, and the energy released by the oxidation of the sulphur provides much of the required energy for the smelting process.

The roasting process has several effects:
a) Drying the concentrates
b) Oxidizing a part of the iron present
c) Decreasing the sulphur content by oxidation
d) Partially removing volatile impurities, for example arsenic
e) Preheating the calcined feed with added fluxes (for example, silica or limestone), in order to lower the energy requirement of the downstream process Environmental concerns have highlighted the need to lower the emissions of sulphur from smelters treating sulphidic raw materials. These emissions emanate primarily from the furnaces and converters, either as fugitive emissions or as process gases vented up a stack. It should be noted that the typical 1 to 2% $SO_2$ in the off-gas from reverberatory furnaces (for example) is too low for effective acid production.

The general trend in recent years has been to eliminate as much as possible of the iron sulphides (usually pyrrhotite) during the milling and flotation stages, in order to minimize the sulphur input to smelters.

Dead roasting, i.e. close to 100% sulphur removal, has the benefit of removing essentially all the sulphur at the beginning of a smelting process. Furthermore, in comparison with the intermittent nature of $SO_2$ produced in a converting operation, a steady and almost optimum $SO_2$ content of off-gas from a roaster requires a smaller and less expensive acid plant.

Copper

Various roasting techniques in the recovery of copper are described in the literature. [1-16]

Copper—Brixlegg

In the Brixlegg process, copper was produced by electric smelting of dead-roasted chalcopyrite concentrate in a circular AC (alternating current) submerged-arc furnace, using coal as a reductant.

Brixlegg reports a 95% recovery of copper to blister, and levels of copper in the slag of less than 1% have been claimed. The crude copper averaged only 95% copper, and the operation has been discontinued[1]. Disadvantages of this process are the relatively high copper losses in slag, and the high electrical energy consumption.

An undesirable aspect of the Brixlegg process is the fact that lead passes into the final copper anodes and makes them fragile if the concentration is too high. On the other hand, the exceptionally high recovery of other metals related to copper makes the process of particular interest for treating ores which contain nickel and noble metals. (The nickel can be separated from the anode mud.)

A submerged-arc furnace has been used for treating dead-roasted calcine in a process developed by the US Bureau of Mines[14], as was also used in the Brixlegg process. It was found that in order to produce a high-purity blister (2.2% total impurities) and low-copper-content slag in a submerged-arc furnace, a two-cycle procedure was required. Using this rather inconvenient and non-continuous procedure, recoveries as high as 98% were attained.

Nickel

In the nickel industry, Falconbridge[17-24] and Inco[25-29] have worked on processes involving the smelting of roasted sulphide concentrates. These processes use six-in-line furnaces, commonly employed in that industry, which generally operate at temperatures around 1400° C. The reduction reactions needed to provide the appropriate conditions for recovering metals from the oxides tend to raise the operating temperature of these furnaces. Consequently, large volumes of air are drawn into the furnace to cool the freeboard space of the furnace. This tends to result in high losses of the feed materials as dust. Dust losses of up to 25% of the feed have been mentioned[20].

Nickel production has however been accompanied by a level of $SO_2$ generation which is environmentally unacceptable. It has been recognised that a major means to reduce $SO_2$ emissions is to increase the degree of sulphur elimination in the fluidized-bed roasters. However, the existing furnace technology is limited in the degree to which highly roasted concentrates can be handled. The higher degree of roast demands more strongly reducing conditions in the furnace to smelt more oxidized calcine feed, and to counteract slag losses. Higher coke addition rates are needed. Extra energy is generated by the additional coke combustion products, resulting in a higher temperature in the furnace freeboard. This requires greater amounts of cooling air to control the temperature. The furnace off-gas handling system capacity would have to be expanded to handle the greater quantities of gas. Also, the more metallized matte melts at higher temperatures, demanding superheated slags to control matte temperatures and bottom build-up. Refractory erosion in the slag zone with higher temperature slags must be controlled by cooling the refractory with copper coolers.

About 25% of the calcine escapes the six-in-line furnace; as much as possible of this is recycled back to the furnace[20].

Inco's roast-reduction smelting process[25-29] involves deep roasting of nickel concentrate in fluidized-bed roasters. The roaster off-gas is treated in a sulphuric acid plant. The low-sulphur calcine is reduction smelted with coke in an electric furnace to yield a sulphur-deficient matte. This sulphur-deficient matte is converted to Bessemer matte in Peirce-Smith converters, with minimal evolution of sulphur dioxide (because of its sulphur-deficient nature), and the converter slag is returned to the electric furnace. Excellent recoveries of nickel were obtained, and the process was developed up to commercial-scale testing at the Thompson smelter during 1981 to 1982. Flash smelting of bulk copper-nickel concentrates was considered superior at Inco's Copper Cliff smelter, but it was seen that in other circumstances the roast-reduction process could be an attractive option.

Sulphur is eliminated from the concentrate mainly in the roasters, running at 830 to 850° C. The high temperatures promoted high oxygen efficiency, of approximately 95%. Slurry feeding permitted excellent control of the air to concentrate ratio in the roaster, and good control of sulphur elimination (approximately 80%). The process resulted in higher furnace temperatures, as well as higher iron levels to be oxidized in the converters.

U.S. Pat. No. 4,344,792[25] describes the possibility of smelting either a partially roasted concentrate or a blend of dead-roasted concentrate and green concentrate, together with a carbonaceous reductant and silica flux. The feed is to contain only sufficient sulphur to produce a matte, in which the iron is present as metallic iron, and which has a sulphur deficiency of up to 25% with respect to the stoichiometric base metal sulphides $Ni3S_2$, $Cu_2S$, and $Co_9S_8$. The iron is later converted, to produce a low-iron matte by blowing and slagging the iron with silica flux, with very little release of sulphur dioxide during this stage of the process.

A process for the treatment of pyrrhotite, based on roasting to eliminate all or part of the sulphur, and hydrometallurgical treatment of the calcine to recover nickel, is described in Kerfoot[30].

Platinum Group Metals

Sulphide ore concentrates containing platinum group metals (PGMs) have been roasted for various leaching processes.

The US Bureau of Mines devised a procedure for selectively extracting PGMs and gold from Stillwater Complex flotation concentrate. The concentrate was roasted at 1050° C. to convert base-metal sulphides to oxides, and the PGMs from sulphide minerals to their elemental states. The roasted concentrate was then treated in a two-stage leaching process. Up to 97% of the platinum, 92% of the palladium, and 99% of the gold were extracted from the roasted concentrate[31].

Other techniques are described in References 32 and 33.

Zinc

Dead roasting of zinc concentrates is practised at industrial scale at Zincor, in Springs, South Africa. The calcine from this operation is treated by leaching and electrowinning.

A sulphide concentrate comprising 15% copper, 17% zinc, and 10% lead was roasted in a laboratory-scale fluidized bed in China, with the intention of using the product for further hydrometallurgical or direct smelting processing[34].

Prime Western grade zinc has been produced from lead blast-furnace slags (and other zinc-containing waste materials) at large pilot-plant scale at Mintek in Randburg, South Africa, using the Enviroplas process[35]. Feed materials are smelted in a DC arc furnace, and the zinc is fumed off as a vapour, leaving behind a slag containing only small quantities of zinc oxide. The zinc vapour is subsequently treated in a lead splash condenser, resulting in the production of Prime Western grade zinc.

SUMMARY OF INVENTION

The invention provides a process for treating a metal sulphide concentrate which includes the steps of:

a) roasting the concentrate to reduce the sulphide content of the concentrate, and b) smelting the concentrate, under reducing conditions, in an electrically stabilized open-arc furnace.

As used herein the phrase "an electrically stabilized open-arc furnace" means a DC arc furnace or an electrically stabilized single electrode open-arc AC furnace (SOA furnace).

Preferably the roasting reduces the sulphide content to less than 10% sulphur by mass and, more preferably, to less than 1% of the initial amount present, the objective being to reduce the sulphide content to a negligible or otherwise acceptable value. The material produced by this step is referred to herein as "highly-roasted" or "dead-roasted".

Preferably the roasting is done in a way which produces a steady stream of $SO_2$-bearing gas. This gas may be used as a feedstock in a sulphuric acid plant. This step may be implemented in any appropriate way and for example the roasting may be performed in an enclosed vessel such as a fluidized bed reactor, to provide a high-concentration of $SO_2$ in the gas.

Alternatively the $SO_2$-bearing gas which is released in the roasting process may be subjected to gas scrubbing and neutralization.

The elimination of sulphur results in the valuable metals being collected in an alloy or from a vapour rather than as a matte, during the following smelting stage. This is believed to be advantageous as alloys have a greater collection efficiency than mattes.

The term "alloy" is used here to denote a mixture of metals which may or may not contain some sulphur, as distinct from "matte" which is a mixture of metal sulphide.

The aforementioned process may be varied according to requirement and, more particularly, according to the nature of the metal sulphide or metal sulphide which are being treated.

When used for the treatment of zinc sulphide the calcine from the fluidized bed reactor may, optionally, be agglomerated before being fed to the arc furnace.

The reductant used in the furnace may be of any suitable kind and may for example be coke.

Zinc in the calcine is reduced to metal vapour and may be fumed off in a gas stream for recovery in any suitable way, for example in a lead splash condenser.

The aforementioned process as used for the treatment of zinc sulphide is particularly suitable for the treatment of zinc concentrates and zinc ore which contain relatively high levels of manganese, for example as encountered in the Gamsberg deposit in South Africa which has a manganese content which is higher by a factor of about 10 than the manganese content normally encountered in zinc concentrates.

The process may also be used for the treatment of nickel, copper and cobalt sulphide concentrates, whether existing as separate or combined sulphide, and PGM concentrates. The PGM concentrates may also be in the form of green furnace matte which is produced in any appropriate way, for example by making use of a six-in-line electric furnace.

The smelting of the dead-roasted concentrate, in the arc furnace, produces a slag which is depleted in metal values and an alloy. Iron in the alloy may optionally be removed, in oxide form, from the alloy using any suitable technique, such as by making use of a Peirce-Smith converter or a Top Blown Rotary Converter (TBRC).

Other undesirable elements such as carbon, silicon, or chromium, may be removed from the alloy using any suitable technique such as converting, or refining in a ladle furnace for example.

If the converter is used then alloy from the converter or, otherwise, alloy drawn directly from the arc furnace, if the converter is not used, is atomized so that it is in a form which is suitable for subsequent hydrometallurgical recovery of metal values, e.g. using a suitable leaching process.

Atomization of the alloy solves the problem of having to crush and mill an extremely tough alloy.

The green furnace matte may be granulated and milled, or water atomized, prior to the roasting step.

The smelting step may be a two-stage reduction smelting process, particularly when treating concentrates containing appreciable quantities of nickel and copper.

In the first stage, use could optionally be made of an arc furnace which is operated under slightly reducing conditions. This stage allows for the settling of some of the copper and nickel in an alloy, and a large fraction of the PGMs which partitions to the alloy.

In the second stage, which may be carried out in an arc furnace which is operated under highly reducing conditions, substantially all of the remaining nickel, the remaining PGMs, and most of the cobalt, are removed in an iron-based alloy which may also contain some copper.

The iron-based alloy may be atomized in preparation for hydrometallurgical treatment, e.g. for treatment in a leaching step.

The copper/nickel alloy from the first stage may be prepared for hydrometallurgical recovery by being water or gas atomized, granulated, or crushed and milled.

In carrying out the process of the invention use is made of a stabilised open arc furnace. A suitable furnace of this type is a DC arc furnace. The invention is however not limited in this regard for it may be possible to stabilise the arc or arcs of an AC arc furnace, using suitable control techniques, to achieve characteristics which are similar to those of a DC arc furnace in that the arc, or each arc, extends vertically from an overhead electrode to the charge, is confined, and does not deflect to side walls of the furnace.

Smelting in a DC Arc Furnace

A stabilized open arc furnace offers a number of advantages in the smelting of roasted sulphide concentrates and is seen as the enabling technology to make possible the process of the invention.

A DC arc furnace is roughly cylindrical in shape, often having a conical roof. A single vertical graphite electrode is used as the cathode, and the anode is embedded in the bottom of the furnace, in contact with the molten bath. The usual configuration involves operation with an open transferred plasma-arc above a molten bath with a surface substantially uncovered by feed materials (ie. an "open bath" operation). However, work has also been done using a two-electrode configuration (a twin-cathode is sometimes used for steel scrap or DRI (direct reduced iron) melting, and a two-electrode cathode-anode arrangement has also been used on a pilot scale.) Feed materials are either fed through the center of the electrode, or through a feed port fairly close to the electrode. Fewer feed ports are required with this configuration of furnace than are normally required for an AC six-in-line or a three phase three electrode AC furnace.

The powerful concentrated plasma arc jet provides a very efficient form of energy transfer to the molten bath of the furnace. This enables reactions to take place fairly rapidly, and good mixing is established in the bath, leading to a fairly uniform temperature distribution. The DC arc is relatively stable, not too easily extinguished, and is directed downwards towards the molten bath, with little flare towards the furnace walls. The arc jet 'pulls', via the Maecker effect, the furnace gases towards it, thereby attracting fine feed materials downwards into the bath, in so doing minimizing dust losses from the furnace. The low gas volumes from an electric furnace (compared to a furnace where energy is provided by combustion) also help in minimizing dust losses. The DC arc furnace can handle fine feed materials, typically sized below 3 mm, which makes it well suited for coupling to a fluidized-bed roaster.

The simple configuration of the DC arc furnace allows the freeboard to be well sealed, maintaining the CO atmosphere internally, and minimizing the ingress of air.

Very high operating temperatures (much higher than those usually encountered in conventional base metals smelting) can be attained in the furnace, if required by the process, as power is supplied by the open arc, not merely by resistance heating in the slag. The furnace roof and walls are cooled (for example, by water-cooled copper panels) to retain the integrity of the furnace, even under conditions of high-intensity smelting. Sigh freeboard temperatures are easily accommodated. The possibility of strongly reducing conditions in the furnace (together with the high operating temperature) avoids the common difficulties with the build-up of high-melting magnetite leading to operational problems in the furnace.

The processes described herein have high recoveries of the desired metals, and produce very clean slags. The DC arc furnace works well using iron alloy collection of valuable metals, or fuming off volatile metals. The processes result in low levels of impurities in the desired products.

The application of a DC or SOA arc furnace provides unique advantages particularly for feeds that contain high amounts of iron oxide which requires lots of reduction and for feeds that contain, for example, nickel and cobalt which require low oxygen potentials to achieve low slag losses.

A comparison of the characteristics of conventional furnaces and stabilised open arc furnaces highlights the advantages of using stabilised open arc furnaces in the process of the invention.

Conventional Furnaces

A conventional furnace has limitations in handling CO gas in the freeboard. Sealing the furnace is very difficult with multiple electrodes and feed points and a large cavity for the off-gas system. Rather than attempting to seal the furnace, the standard design involves the addition of air to combust the CO in the furnace freeboard and the addition of even more air to temper the combustion product gases. This results in large off-gas volumes, large quantities of dust make and the need to operate fans in a dirty gas environment.

In reduction smelting, reductants such as coke are mixed into the calcine. The reduction reaction is relatively slow in a conventional smelting configuration where the calcined material is smelted on a slag bath surface. The power density of the furnace which corresponds to the smelting rate cannot exceed the reduction reaction rate. This limitation becomes more important as the degree of roast increases and as the amount of reduction increases.

A calcine bed resting on the slag, or material banked up on the side walls, can roll over into the slag bath and cause unwanted slag foaming.

A conventional furnace (a rectangular six-in-line furnace, for example) requires good distribution of feed over the surface of the slag bath. This requires numerous feed points and a complex feed system above the furnace.

The reduction reaction is dependent on the reductant type. Generally, the need is for fine coke to maximize the reduction reaction rate. Otherwise, coke accumulates at the slag-calcine interface and redirects the furnace power, undesirably.

The metallized matte or metal that results from reduction smelting has a higher liquidus temperature. This necessitates a higher matte or metal temperature. A conventional furnace has poor capability to transfer energy in the vertical direction between the slag and matte phases.

Stabilised Open Arc Furnace

A DC or SOA arc furnace:

(a) is small and intense;

(b) has no obvious limit on coke reduction kinetics. The ultimate case of dead roasting and back reduction to alloy is easily possible;

(c) can use a wide range of reductants eg. coal or coke of various size ranges;

(d) is easy to seal to contain a CO atmosphere, has little offgas, little dust, and few feed points; and (e) produces hot metal Recent developments in electrical power supply equipment have resulted in the possibility of using a three phase AC system to provide electrical energy via a single (graphite) electrode. This can be achieved by the switching of the three phase supply, possibly using pulse width modulation techniques, to generate a high frequency synchronized AC output. This development implies that a furnace configured in a similar manner to a DC arc furnace can be designed and used for similar process applications. Robicon of the USA have a power system (The Harmony Series) that can provide AC power as described above as well as the usual DC power output.

The stability of the AC high frequency arc is claimed to be better than a DC arc. There are a few possible disadvantages of the AC system:

the graphite electrode current capability may be less (skin effect);

the electrode wear may well be somewhat higher than with a DC furnace;

the arc jet and hence heat transfer to the bath may be slightly lower than for a DC arc furnace; and the high frequency may generate harmonics although with suitable solid state switching techniques the harmonics may be reduced.

Potential benefits of an AC single electrode high frequency arc furnace include:

an improved arc stability (the arc is less likely to extinguish under certain circumstances); and the arc may be less susceptible to loss of vertical directionality (e.g. sideways deflection) due to magnetic effects (deflection of the arc can damage the furnace sidewall and increase the energy losses).

Thus a suitably controlled power system can generate a high frequency waveform derived from a 3 phase alternating power supply which can be directly impressed across a single graphite electrode and a charge in a furnace, to produce a single open arc which is analogous to an arc in a DC furnace. This arrangement can offer similar and, in some regards improved, characteristics compared to a DC furnace and the scope of the invention therefore extends to the use of a DC arc furnace or a stabilised open arc AC furnace in the reduction smelting step.

BRIEF DESCRIPTION OF THE DRAWINGS

The invention is further described by way of examples with reference to the accompanying drawings in which.

DESCRIPTION OF PREFERRED EMBODIMENTS

Zinc concentrates of the kind encountered in the Gamsberg deposit have a manganese level which is up to 10 times higher than normal. This high manganese level causes problems and additional costs when recovering the zinc, after leaching, in a conventional electrowinning plant For the electrowinning route much research has been carried out on means of removing the manganese from the electrolyte, or on electrolytic processes which enhance the production of $MnO_2$ at the anode in a zinc cell. The former technique is expensive, and the latter approach, which is directed to the production of high quality electrolytic manganese oxide, appears to be problematical.

It is advantageous to remove sulphur from metal sulphide concentrates before smelting. For example existing PGM and base metal pyrometallurgical processes have a number of limitations, particularly in the converting stage. It is difficult to achieve environmentally acceptable levels of sulphur capture, especially in view of the problem of fugitive emissions from Feirce-Smith converters. Converting is a batch process which has inherent scheduling problems, losses and spillages from the crane transport of ladles, and high labour costs.

Another consideration with conventional furnaces is that there is a limit to the amount of PGM-containing UG2 concentrate that can be treated. A problem with chromite in UG2 concentrate is that it cannot easily be solubilised in slag during normal smelting. A spinel forms, builds up in the furnace, and needs to be dug out frequently.

The invention is described hereinafter firstly with reference to a generalized treatment process, as exemplified in FIG. 1, and thereafter with reference to three particular forms of the process shown respectively in FIGS. 2, 3 and 5.

Figure 1:
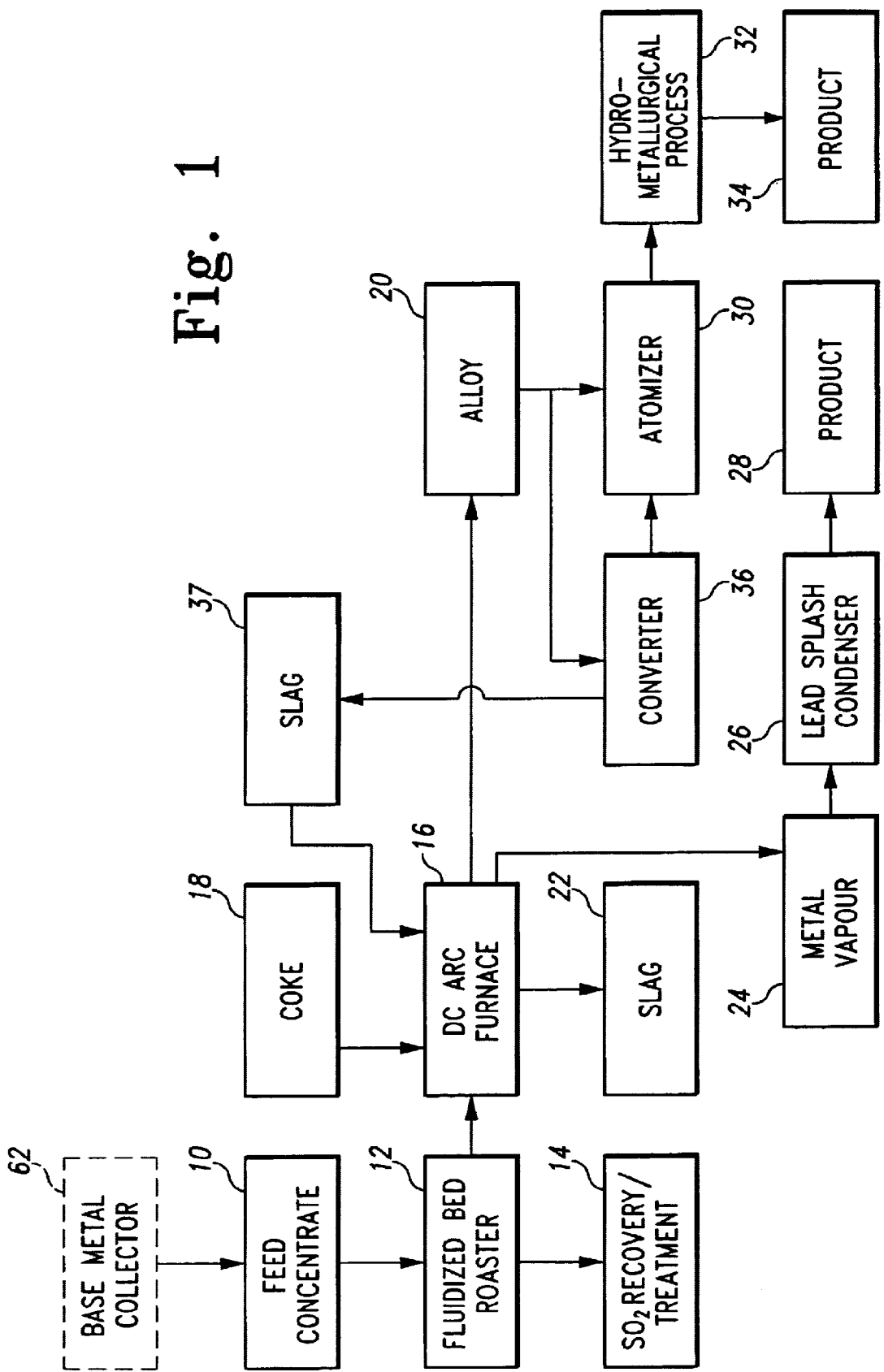
FIG. 1 is a generalised flow chart of process steps according to the invention for the treatment of various metal sulphide concentrates.

FIG. 1 of the accompanying drawings illustrates a generalized process for the treatment of metal sulphide wherein a concentrate 10 of the metal sulphide or metals sulphide is fed to a fluidized bed roaster 12 which, preferably, produces a steady stream of high strength $SO_2$ bearing gas 14 which can be used as feedstock for example in a sulphuric acid plant. This is not essential to the process though, for gas from the reactor could alternatively be subjected to gas scrubbing and neutralization.

The calcined product from the roaster is fed to a DC arc furnace 16 together with a reductant 18 which, for example, is in a form of coke.

In the fluidized bed reactor 12 the sulphur content of the concentrate is reduced substantially, to approximately 10% by mass in the case of high roasting, or to approximately less than 1% of the initial value, or even lower, in the case of dead-roasting. The elimination of sulphur from the concentrate results in the valuable metals being collected in an alloy 20 which is produced by the furnace 16, rather than as a matte. Alloys have a much greater PGM collection efficiency than matte.

The furnace also produces a slag 22 which is depleted in metal values.

The nature of the process thereafter depends on the nature of the concentrate which is being treated. If the concentrate is a zinc-bearing concentrate such as zinc sulphide then the zinc is reduced to metal in the DC arc furnace and fumed off in a gas stream or vapour 24 which is mainly zinc and carbon monoxide. The gases are led directly to a lead-splash condenser 26 for absorption, or condensing, and subsequent recovery as a product 28.

For the treatment of copper, nickel or cobalt sulphide, or PGM sulphide, the alloy produced by the DC arc furnace may be atomized (step 30) and then subjected to a hydrometallurgical recovery process 32 to produce a product 34. Alternatively the alloy is first fed to a converter 36 such as a Peirce-Smith converter and then to the atomizer 30 and through to the hydrometallurgical process 32.

The converter slag 37 may be returned to the DC arc furnace 16.

The process 32 may be of any appropriate type and a particularly suitable process 32, which is intended to fall within the scope of the invention, is described hereinafter with reference to FIG. 5.

Figure 2:
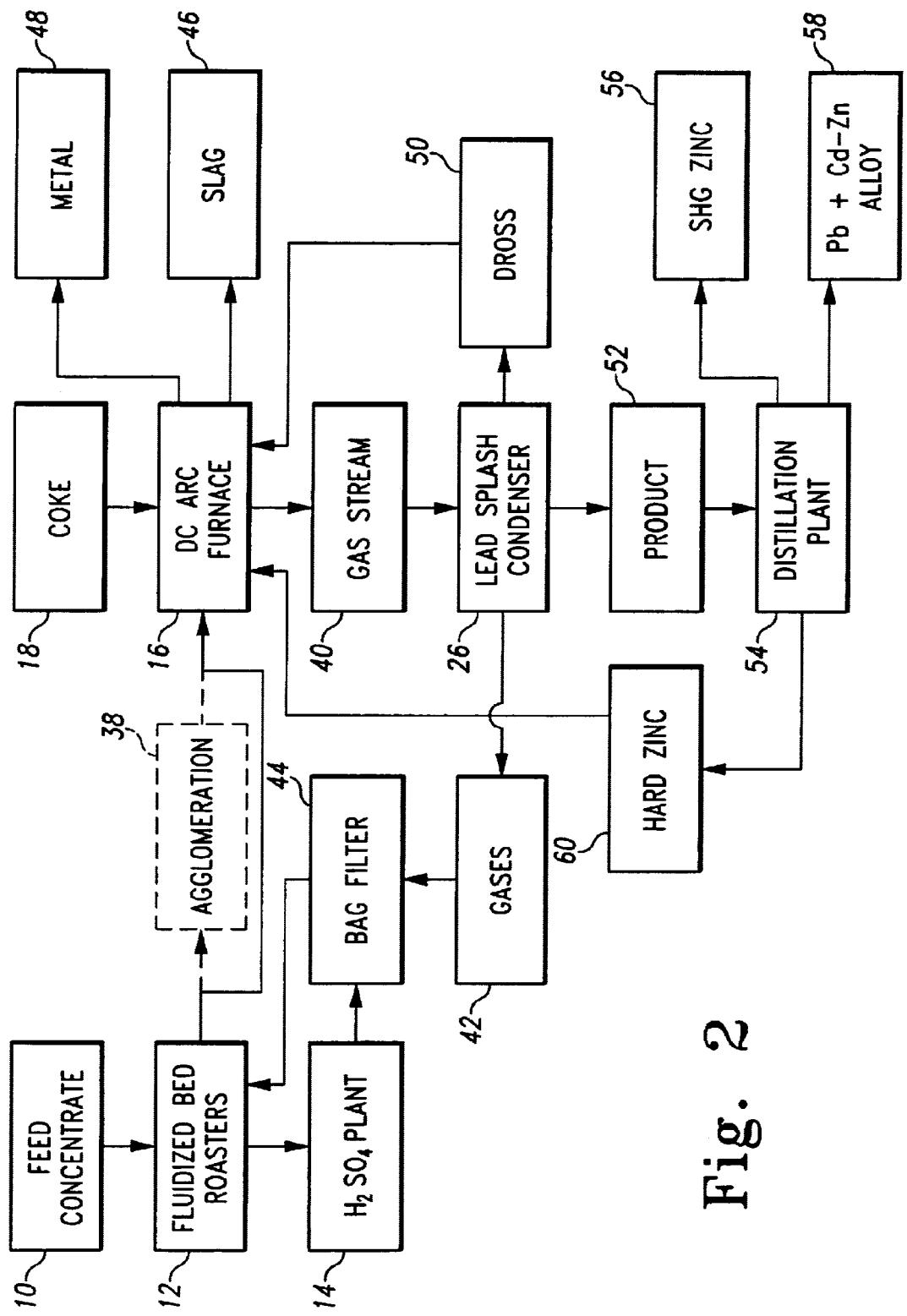
FIG. 2 illustrates a variation of the generalised process of FIG. 1 suitable for the treatment of zinc concentrates.

FIG. 2 is a particular example of the process of FIG. 1 for the recovery of zinc from a high manganese ore such as for example the Gamsberg lead-zinc deposit.

It is assumed that the mining of ore from the Gamsberg deposit, followed by grinding and flotation, yields a concentrate 10 which contains about 48% zinc, 29% sulphur, from 4% to 5% manganese as oxide, and 5% moisture. The concentrate 10 is fed from a suitable store to fluidized bed roasters 12 where the sulphur content of the concentrate is reduced to approximately 0,75%. The gases from the roasters are cooled in a waste heat boiler, cleaned in cyclones, subjected to electrostatic precipitation, and are then passed to a sulphuric acid plant 14. It is assumed that the final exhaust gases can be discharged to atmosphere without the need for scrubbing out the last traces of sulphur dioxide.

The calcine which contains about 58% zinc as oxide is fed with dry coke 18 and a small amount of lime to the DC arc furnace 16, with a sealed freeboard. The calcine may optionally be agglomerated in a step 38 before being fed to the DC arc furnace. This step does however involve additional capital and operating costs.

In the DC arc furnace the zinc oxide is reduced to metal and fumed in a gas stream 40 which principally contains zinc and carbon monoxide. These gases are led directly to the lead splash condenser 26 where the zinc and any lead are removed from the gas stream by absorbing or condensing these metals in a curtain of lead droplets. The gases 42 exiting the condenser are burnt in a combustion chamber, cooled in a waste heat boiler and are cleaned in a bag filter 44 before being exhausted to atmosphere. The maximum concentration of sulphur dioxide in the exhaust gases is estimated to be less than 100 parts per million which does not pose an environmental problem. The dust collected in the bag filter, which consists mainly of zinc oxide, is washed with water to remove any halides before being returned to the roasters.

Slag 46 which is produced by the furnace is granulated before being removed to a waste storage dump. A small amount of metal 48 produced in the furnace is periodically tapped from the furnace and is run into rough moulds.

Dross 50 from the lead splash condenser 26 is collected and batch treated in a small furnace to separate out lead. The dry dross is then recycled to the DC arc furnace. Impure zinc 52 from the lead splash condenser is transferred by ladle to a zinc distillation plant holding furnace. A plant of this type requires a constant feed and consequently provision is made for casting ingots or reheating ingots to balance the flow from the condenser so that the requirements of a zinc distillation plant 54 are met. The distillation plant produces SHG (Special High Grade) zinc 56, an impure lead and cadmium-zinc alloy 58 which is treated according to requirement, and a small amount of hard zinc 60, in the form of a Zn—Pb—Fe—Cu alloy, which is recycled to the DC arc furnace.

Figure 3:
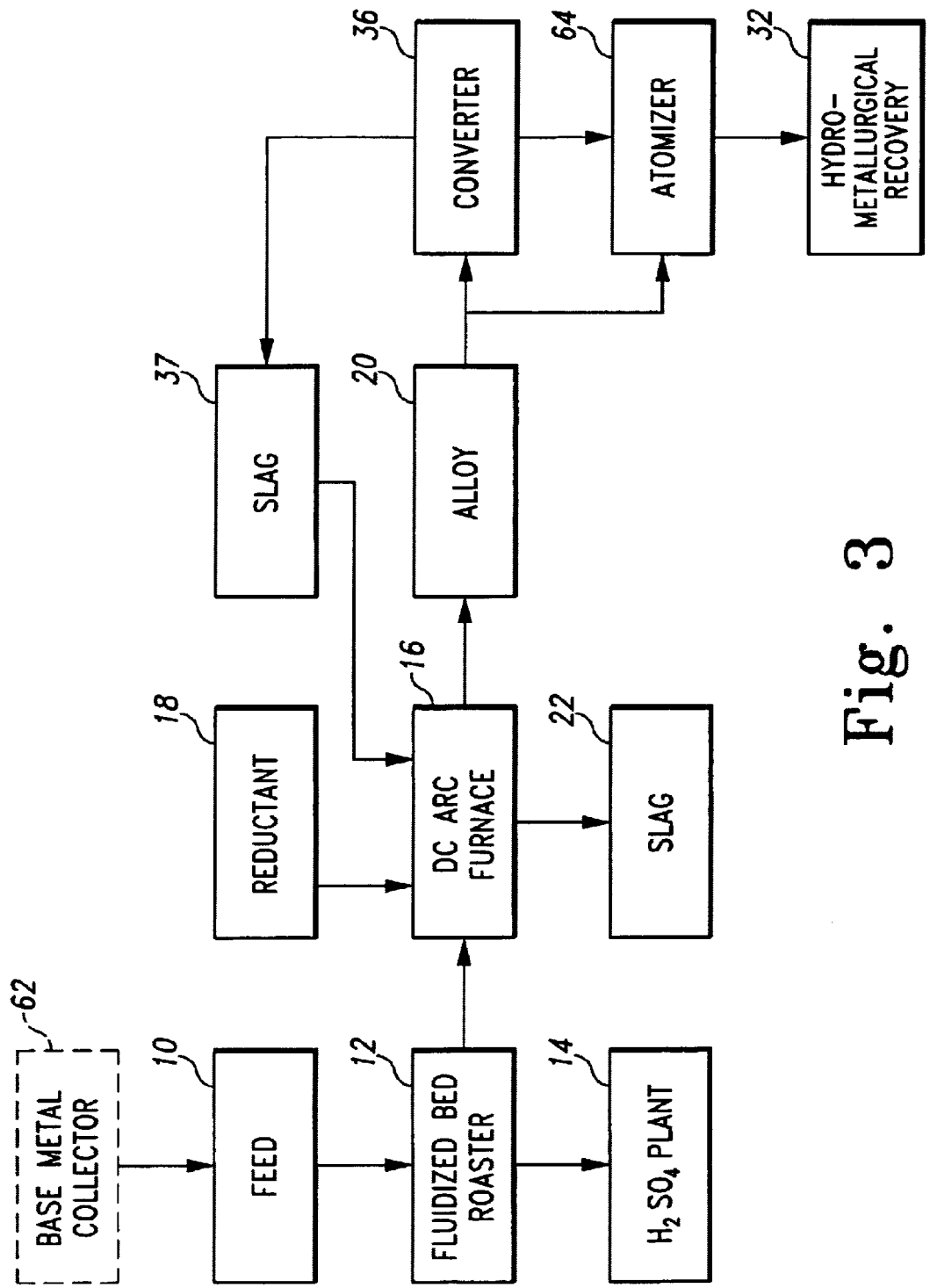
FIG. 3 illustrates a variation of the generalised process of FIG. 1 suitable for the treatment of PGM and nickel and copper sulphide concentrates.

FIG. 3 illustrates the steps of a particular form of the process shown in FIG. 1 used for the treatment of PGM and base metal concentrates 10.

The feed material 10 is dead-roasted in a fluidized bed roaster 12 which effectively reduces the sulphur content of the concentrate to zero. This limits later sulphur emissions from the concentrate. The reactor 12 produces a steady stream of $SO_2$-bearing gas which is used as feedstock for a sulphuric acid plant 14. It is to be noted though that the $SO_2$-bearing gas may alternatively be subjected to gas scrubbing and neutralization instead of being used as feedstock.

The concentrate, after being roasted, is fed to a DC arc furnace 16 to produce an alloy 20, and a slag 22 which is depleted in metal values and which is discardable.

It may possibly be beneficial to add a base metal collector 62, as is indicated in FIGS. 1 and 3 in dotted outline, to the fluidized bed reactor 12. For example by adding nickel (e.g.

in the form of nickel sulphate) or copper (e.g. in the form of copper sulphate) to the fluidized-bed roaster, along with the concentrate, a greater quantity of nickel or copper (as oxide) is established in the furnace feed, and this decreases the requirement to reduce a large quantity of iron which would otherwise be required to produce sufficient alloy for effective collection of the valuable metals.

Any base metal oxide, sulphate or sulphide, which is compatible with the process and which is in a fine form which can react with the feed, could be used as a collector.

The alloy 20 may directly be passed to an atomizer 64 which makes the alloy suitable for subsequent leaching in a hydrometallurgical step 32, for the recovery of metal values. Alternatively the alloy is fed to a converter 36 which removes most of the iron from the alloy in oxide form. The resulting slag 37 may be returned to the DC arc furnace 16. Thereafter the alloy is atomized and subjected to the aforementioned leaching step to enable the metal values to be recovered.

Disadvantages or problems which are overcome or reduced are the difficulty of hot ladle transportation from the furnaces to the converters which create scheduling problems in the converter aisle, losses due to spillages, skull formation in the ladles, high labour and maintenance costs as well as pollution problems. Advantages include the elimination or reduction of the Cr-spinel problem in the furnace, the tolerance for higher Cr-levels in the feed, with resulting higher PGM recoveries, the avoidance of the matte breakout problem, a lowering of energy consumption and, in one variation of the process, the elimination of the converter.

The process is also able to accommodate a wide range of feed materials, up to 100% UG2 (in the case of PGM concentrates), with a higher chromite content. This provides significant advantages with respect to PGM recovery in the mining and concentrating operations.

Figure 4:
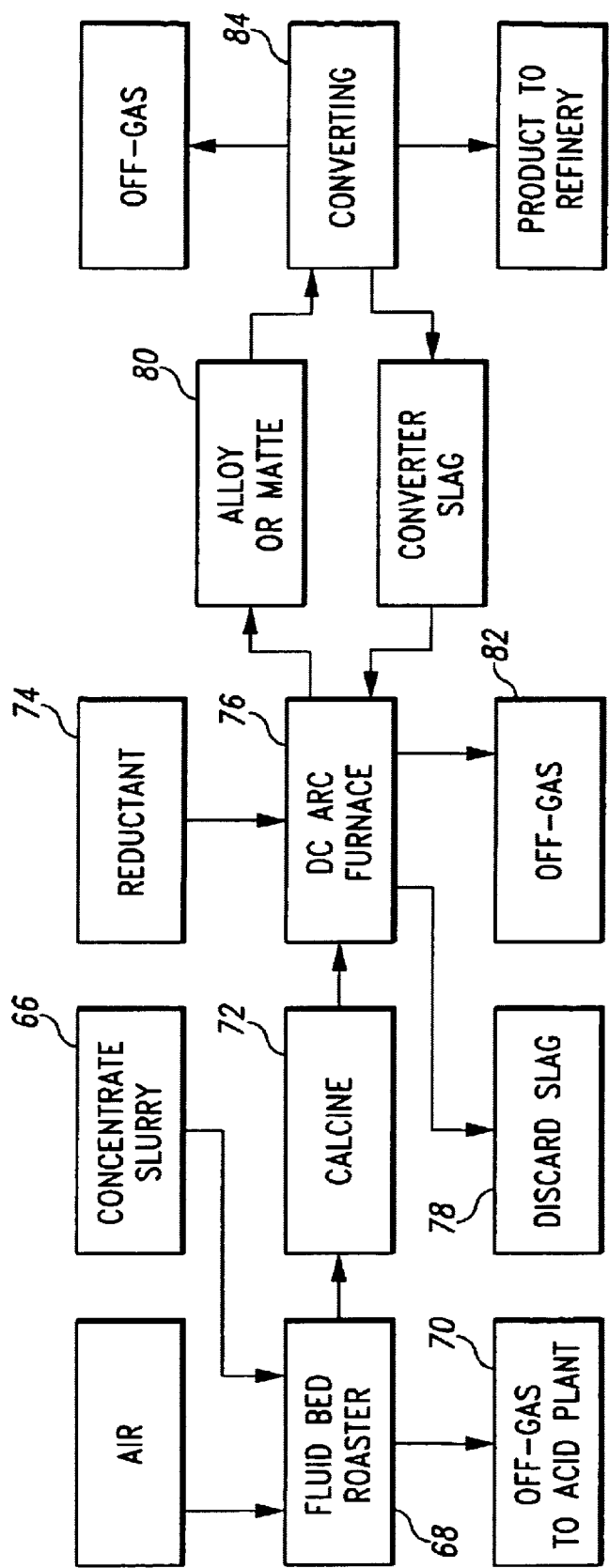
FIG. 4 is a general flowsheet of high roast-reduction.

FIG. 4 illustrates a general flowsheet of high roast-reduction smelting of base-metal sulphide concentrate which incorporates a DC arc furnace. It is understood that there are a number of variations of this flowsheet.

Concentrate slurry 66 is continuously fed to fluid bed roasters 68. The degree of concentrate sulphur elimination (degree of roast) may vary from 70% all the way to 100% (i.e. dead-roast). Roaster off-gas 70 is cooled, cleaned, and directed to an acid plant for $SO_2$ fixation. Calcine 72 premixed with flux and coal 74 is smelted in a DC arc furnace 76. The smelting furnace would produce discard quality slag 78. The grade, iron and sulphur content of the alloy or matte 80 produced will depend on the degree of roast and the ratio of reductant to calcine. The furnace off-gas 82 would be of a low volume and high CO concentration. A high grade, low sulphur, highly metallized matte from the furnace would require minimal treatment in a pyrometallurgical converting process 84.

The following is a list of variations of the general flowsheet in FIG. 4:

pre-reduction (solid state) of the calcine in an external vessel;

pre-heating of the calcine in an external vessel;

reuse of the DC furnace off-gas for either of the above;

direct hydrometallurgical refining of the DC furnace alloy/matte; and cleaning of the converter slag in a suitable slag cleaning process.

The DC arc furnace can easily accommodate the high degree of oxide reduction required. The DC arc furnace also allows for the production of more alloy as more reductant is added to the furnace.

Figure 5:
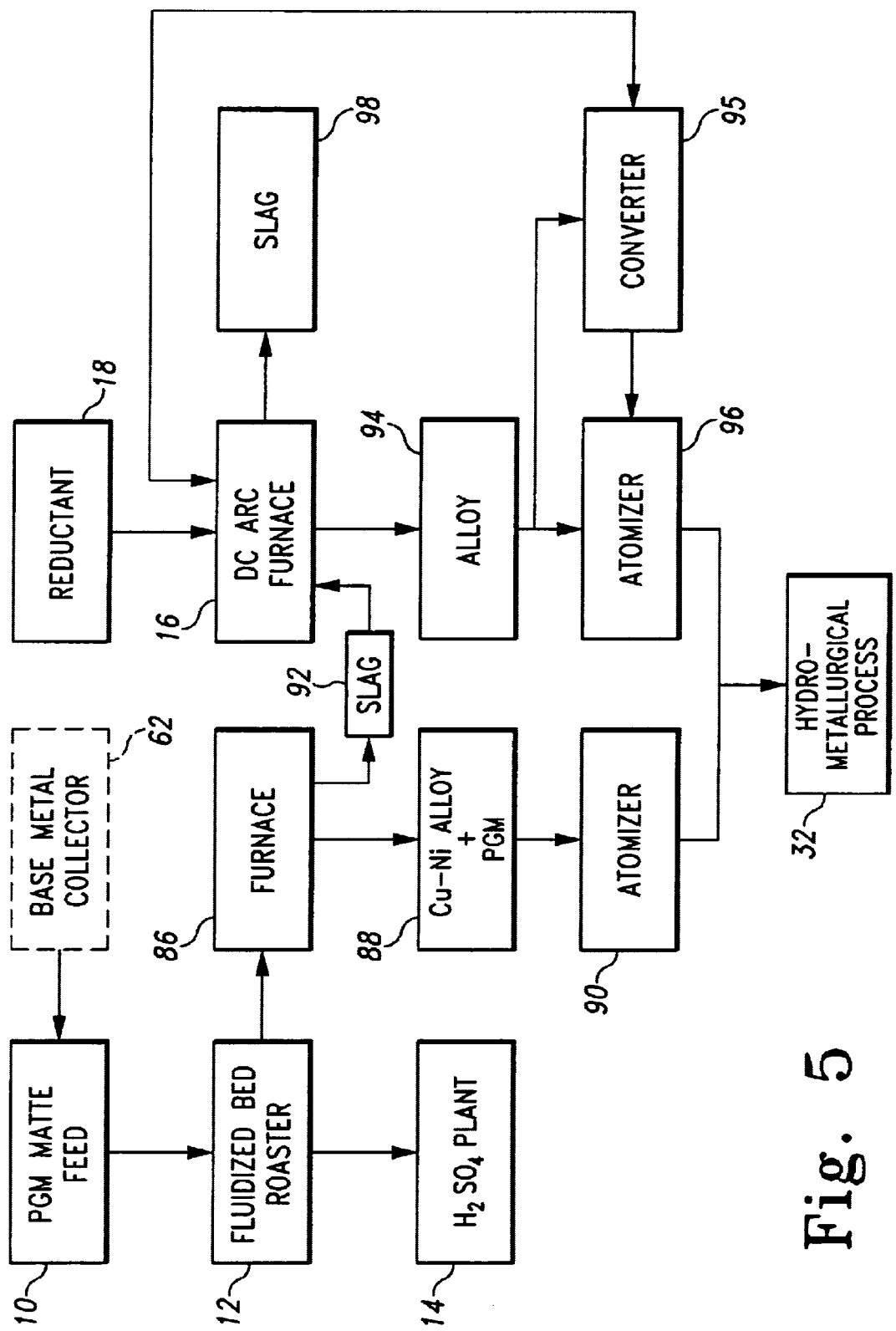
FIG. 5 is a particular example of the process of FIG. 1 for the treatment of PGM matte concentrates.
Figure 6:
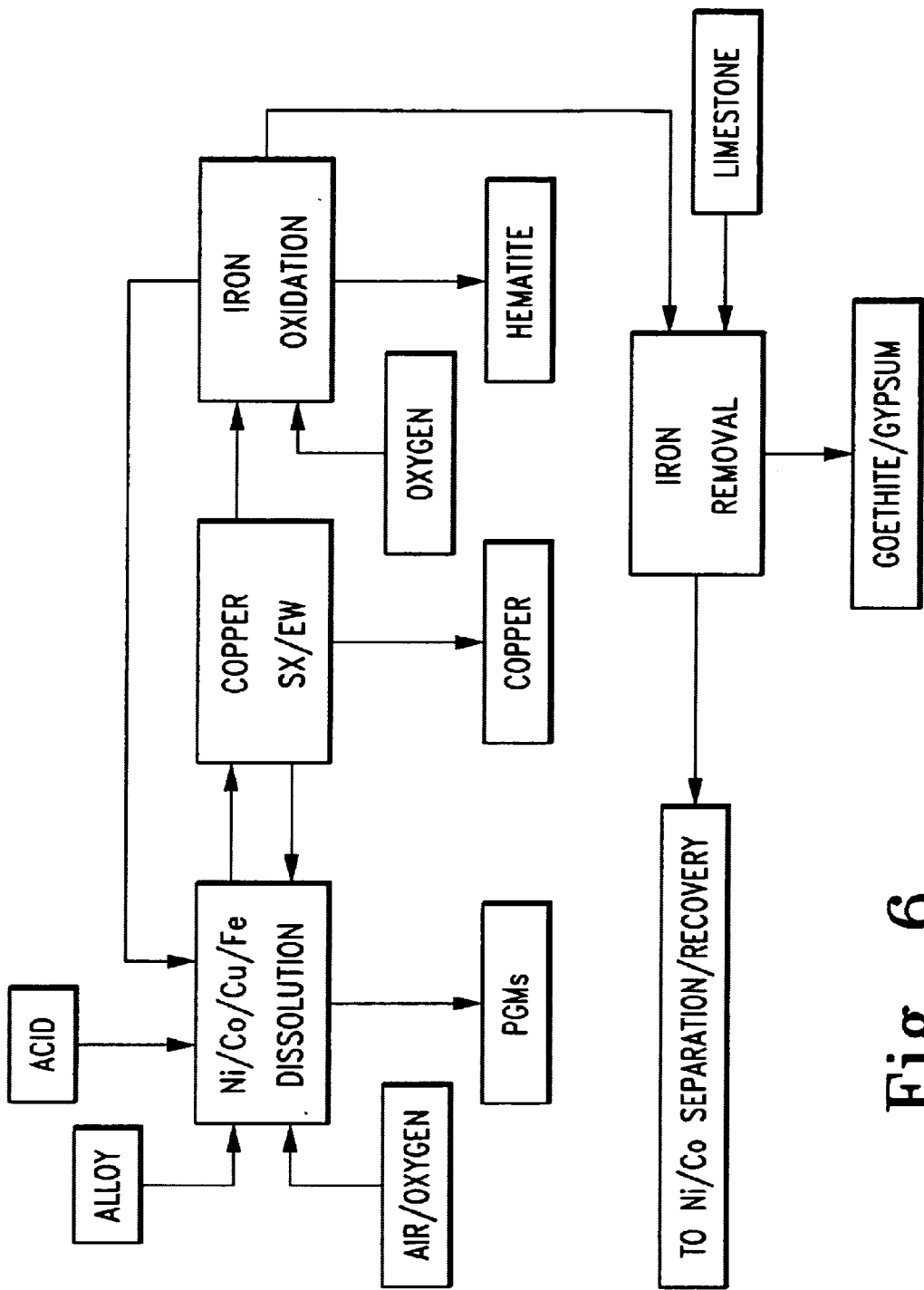
FIGS. 6 to 10 depict hydrometallurgical treatment procedures which can be used in the process of the invention, the choice of a particular procedure depending on the elements of interest in the alloys which are produced in a preceding pyrometallurgical phase of the process.
Figure 7:
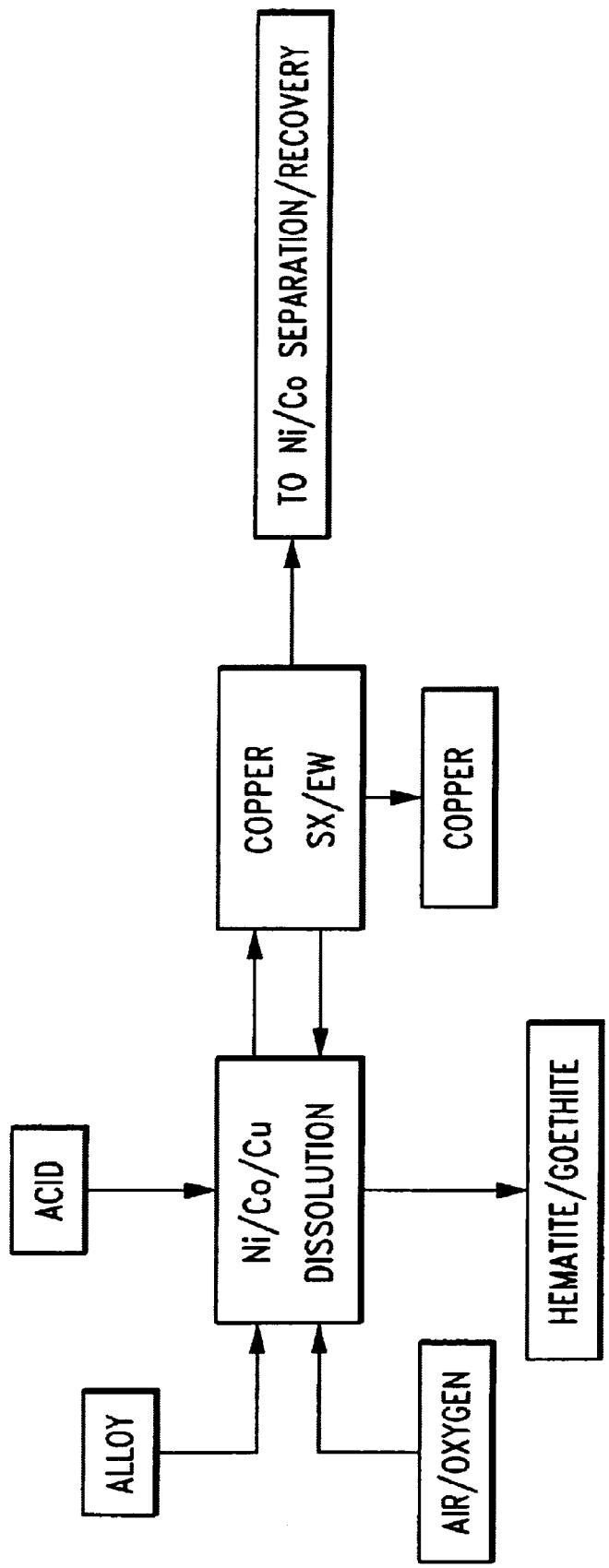
Figure 8:
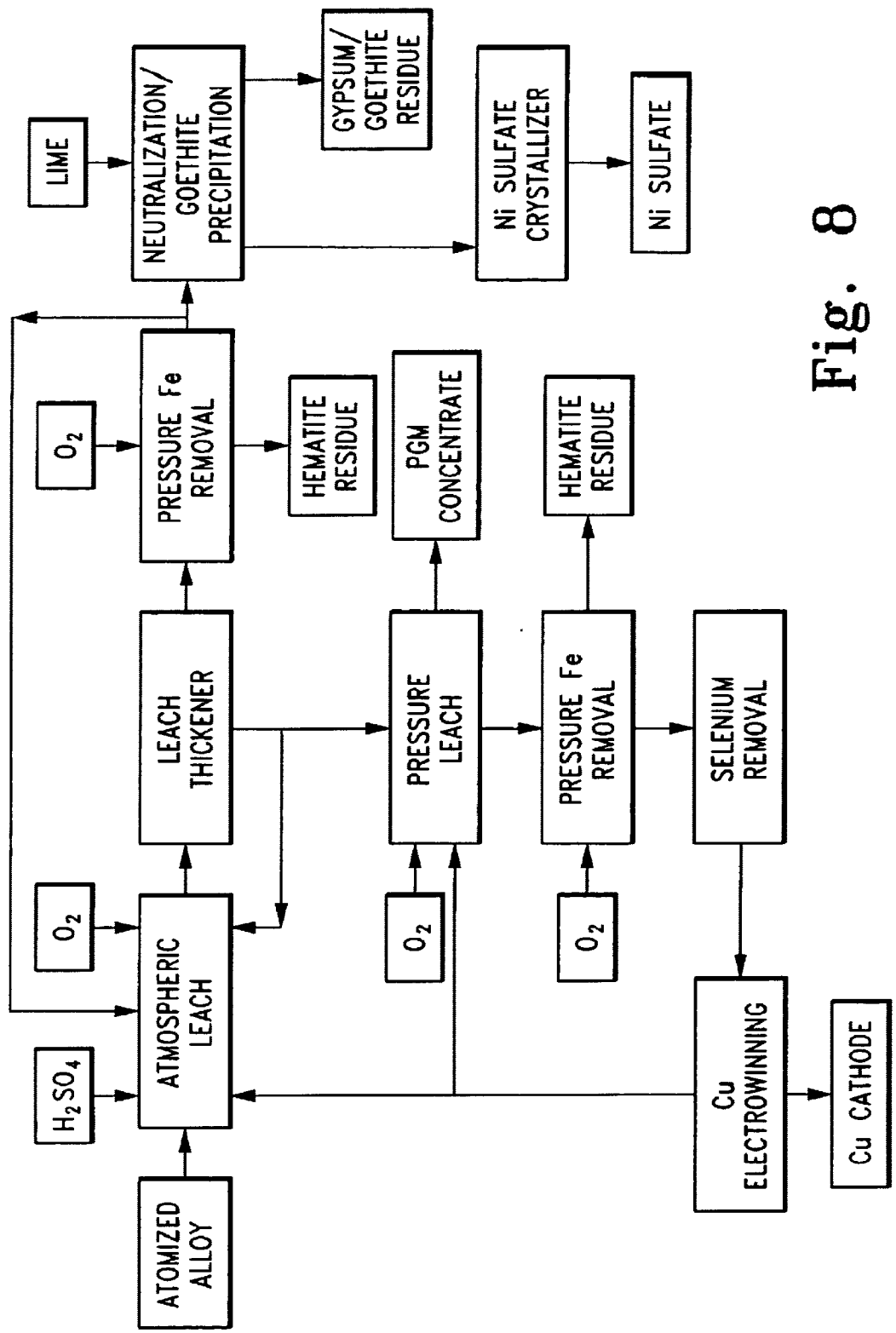
Figure 9:
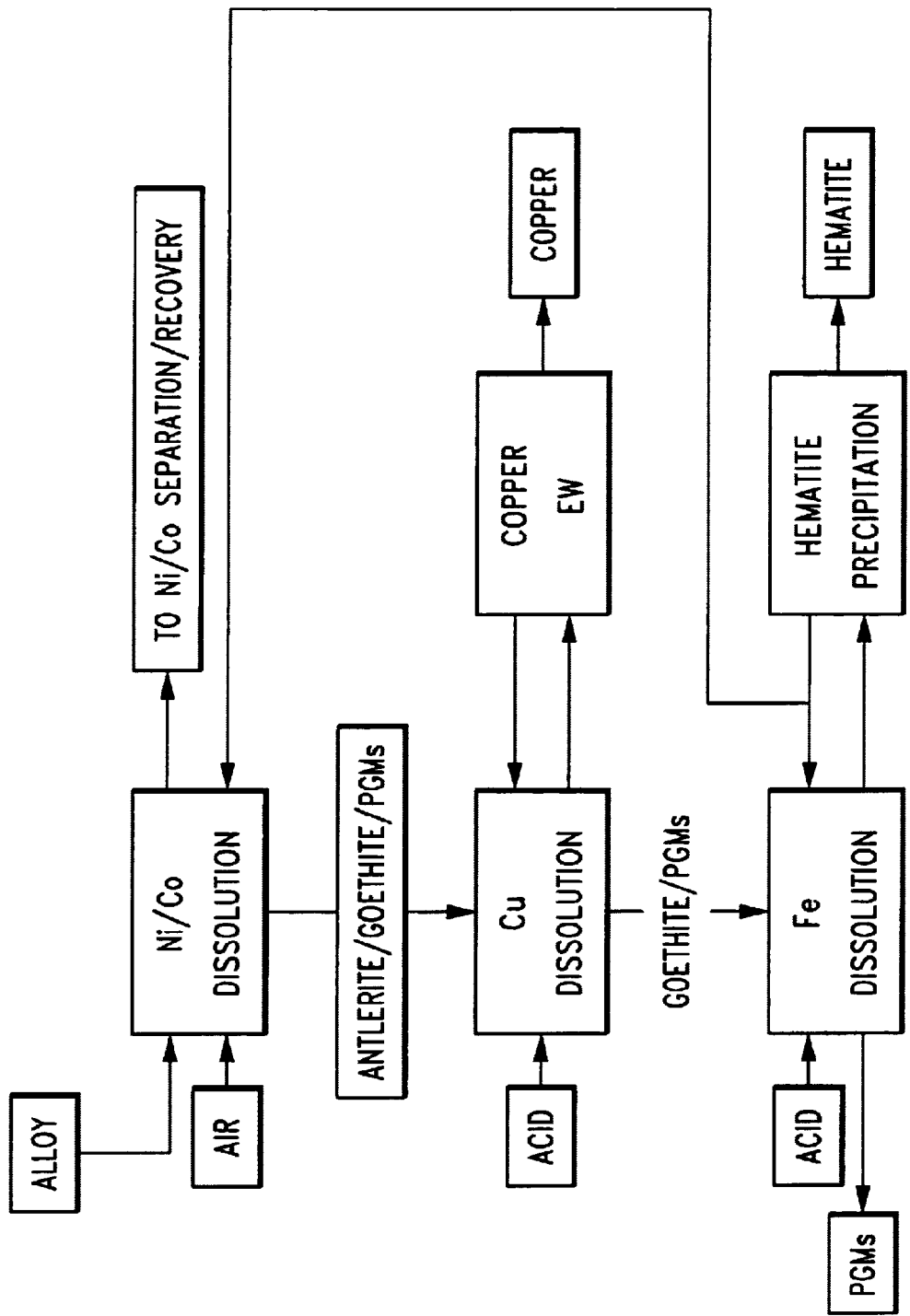
Figure 10:
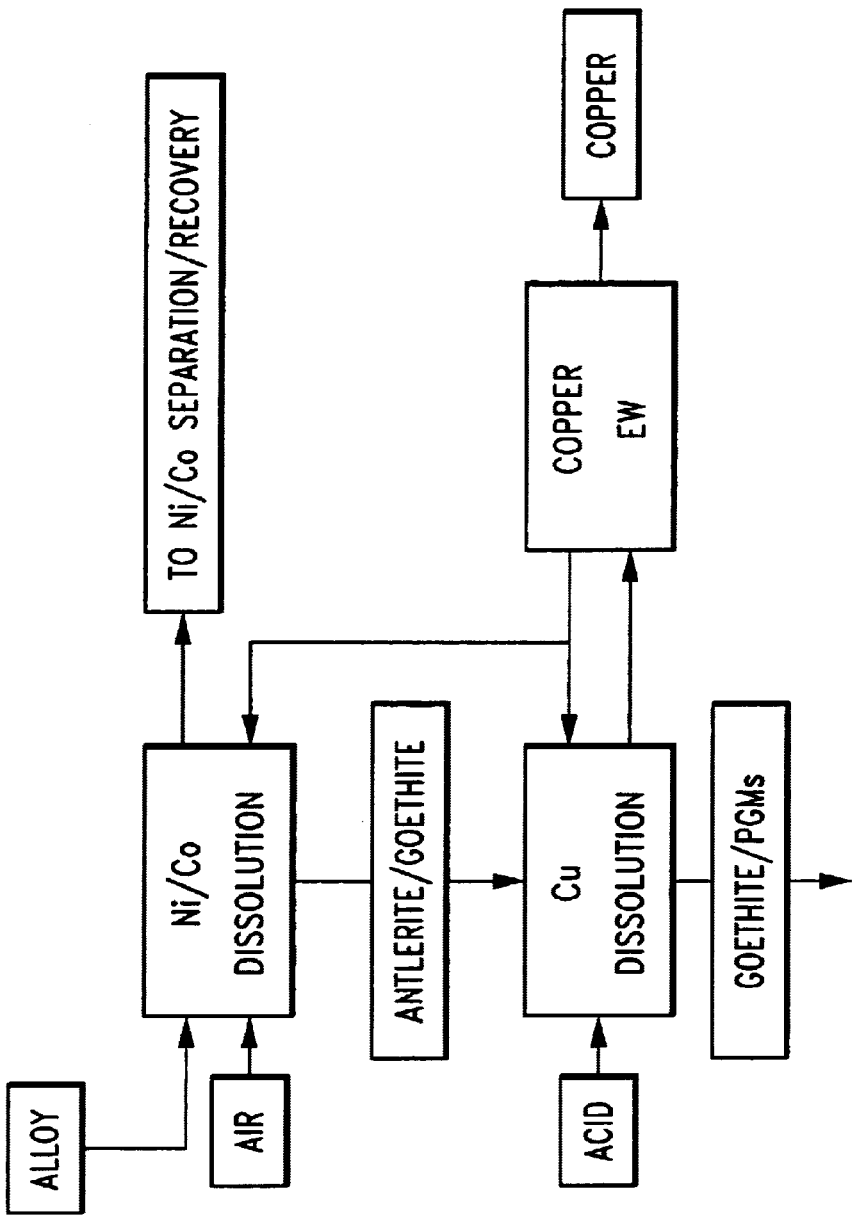

FIG. 5 illustrates a particular form of the technique of FIG. 1 wherein, in a continuous process, sulphur is removed by the dead-roasting of PGM-containing matte followed by a smelting stage under reducing conditions.

A six-in-line or a three-electrode furnace is used for the production of PGM-containing matte from concentrate. The green furnace matte is then granulated and milled, or water atomized, to produce a feed 10 which is fed to the fluidized bed roaster 12. A steady stream of gas containing $SO_2$ is fed to a sulphuric acid plant 14.

The roasted material is then subjected to a two-stage reduction smelting process which makes use of a first furnace 86 and a second furnace 16, which is a DC arc furnace. The first furnace may be of any appropriate type and may for example be a DC arc furnace. The first furnace allows for the settling, under slightly reducing conditions, of some of the copper and nickel as an alloy 88. A large fraction of the PGMs partitions to this alloy which is then treated in an atomizer 90 before being directed to a hydrometallurgical process 32.

Slag 92 from the furnace 86, and a reductant 18 are fed to the second furnace 16 which operates under highly reducing conditions in order to remove virtually all of the nickel and PGMs contained in the slag, along with most of the cobalt, to produce an iron-based alloy 94 which may also contain some copper. This alloy passes to a converter 95 and is then atomized in a step 96 in preparation for leaching in a hydrometallurgical process 32. Slag from the converter may be returned to the furnace 16.

Slag 98 produced by the DC arc furnace is discardable and is sufficiently devoid of valuable metals that it can either be discarded or used in applications such as road construction or shot blasting.

Again it should be noted that a base metal collector 62 could be used, as has been described hereinbefore, to decrease the capability which would otherwise be called for, of the furnace to reduce a large quantity of iron.

A simpler and potentially more cost effective process to the aforementioned two-furnace process involves the single-stage smelting of the roasted furnace matte in a DC arc furnace. This is essentially the technique which is shown in FIG. 3, where the feed material 10 is a green furnace matte. The simpler process requires fewer process units but it has the disadvantage of capturing all base metals and some iron together with the PGMs.

A number of examples of the invention have been described hereinbefore. In each case the concentrate, which optionally is in green furnace matte form, is dead-roasted and thereafter is smelted under reducing conditions. The essentially complete removal of sulphur means that later sulphur emissions are limited. The spine problem (in the smelting of high chromite containing PGM concentrates) is reduced and discardable slags are produced.

The feed to the DC arc furnace is pre-heated in the fluidized bed reactor. It is to be noted that a DC arc furnace is well suited to handling fines. The alloy which is produced by the DC arc furnace can be water atomized (step 64).

Although it is possible to make use of a converter it is also possible to eliminate the need for a converter and in this way the likelihood of spillages is reduced and scheduling problems are also reduced.

The nature of the hydrometallurgical process 32 depends on the major elements of interest in the alloys which are produced by means of any of the aforegoing pyrometallurgical techniques. Typically these elements are iron, nickel, copper, cobalt and PGMs. The hydrometallurgical processing of these alloys depends on case-specific factors. The unit operations that could be applied in the treatment of the alloy include ambient-pressure leaching, pressure leaching, precipitation, solvent extraction, electrowinning and crystallisation. The principles of the individual unit operations are generally known in the industry. They may be used in a wide variety of combinations, and a person skilled in the practise of hydrometallurgy will be able to devise an appropriate circuit for any specific case.

Each of the Examples shown in FIGS. 6 to 10 embodies a general approach, and is not meant to limit the applicable hydrometallurgical option for processing the alloy in question. Process steps for the removal of impurity elements such as selenium are omitted for the sake of brevity, but it should be understood that they would be incorporated as necessary, as known to those skilled in hydrometallurgy. Where acid addition is shown, it may be either fresh acid or acid recycled from a metal recovery stage such as electrowinning.

The copper solvent extraction and electrowinning stages are as conventionally practised in the industry.

The iron precipitation can be done at elevated pressure and temperature, such that hematite is precipitated and acid is regenerated for recycle. It could also be done by means of neutralisation with an appropriate alkali (an example is limestone, but a number of others exist) such that goethite, jarosite, basic ferric sulphate or other similar compound is precipitated.

The solutions containing cobalt and/or nickel (shown as proceeding to Ni/Co separation and recovery) would be treated in the same way as is done in conventional base metal refining, for the recovery of the cobalt and/or nickel. This could entail the precipitation of cobalt(III) hydroxide or the solvent extraction of cobalt, and the electrowinning of nickel and/or cobalt. Alternatively, it could entail the crystallisation of mixed or separate cobalt and/or nickel salts, or the precipitation of hydroxides, sulphide or carbonates. Ion exchange could also be used in some cases.

The examples in FIGS. 1 to 5 have been described with reference to the use of a DC arc furnace. This is non-limiting for, as has been indicated hereinbefore, a DC arc furnace is a particular form of a stabilised open arc furnace. Although use of a DC arc furnace is preferred and the operation of a furnace of this type is well established it is possible to make use of an AC open arc furnace which has been stabilised, using suitable control techniques, to confine the arc in the furnace so that it extends vertically from an overhead electrode and does not diverge to side walls of the furnace.

EXAMPLE 1

FIG. 6

This Example applies to those situations in which the alloy contains PGMs and valuable base metals. In the first step, the iron and base metals are dissolved, leaving a residue that comprises a PGM concentrate that can proceed to a PGM refinery. Oxidative leaching would normally be used, but non-oxidative leaching may also be used (in which case the air/oxygen supply to the leach would be omitted). Elevated temperature and pressure may be used, either alone or in combination with ambient-pressure leaching. In some cases, elevated pressure may not be necessary. The resulting solution could be passed directly to a copper solvent extraction and electrowinning sequence for copper recovery, or it could be passed to an iron-precipitation stage and then to the copper solvent extraction and electrowinning stage. The raffinate from copper solvent extraction would be neutralised and any remaining iron precipitated, to produce a solution containing mainly nickel and/or cobalt, from which these metals can be recovered.

EXAMPLE 2

FIG. 7

This Example applies when PGMs are not present in the alloy, for example when the alloy comes from the reduction of converter slag, for the recovery of base metals. Often, this will entail cobalt as the major metal value. In this case, the oxidative leach would be operated so as to solubilise the copper, nickel and cobalt while rejecting all or most of the iron as a hematite or goethite residue. After copper solvent extraction and electrowinning, the cobalt/nickel solution would proceed to conventional treatment for the recovery of nickel and/or cobalt.

EXAMPLE 3

FIG. 8

In this Example an atomised alloy from a smelting plant is fed to an atmospheric leach, where the bulk of the iron and nickel is leached in the presence of oxygen and sulphuric acid, at a temperature between 30° C. and 95° C. The copper from the electrowinning spent recycle is cemented in the atmospheric leach and assists in the leaching of the iron and nickel. Conditions for the atmospheric leach were optimised during a laboratory scale test programme. A pilot-scale (100 L) batch atmospheric leach, based on the optimised conditions, was performed on 5.5 kg of atomised alloy. The performance of the pilot-scale batch leach is summarised below.

| Element | Feed, g/l | Filtrate, g/l | Alloy, % | Residue, % | % Leached |
|---|---|---|---|---|---|
| Fe | 5.65 | 49.60 | 58.5 | 4.12 | 98.9 |
| Ni | 105.2 | 148.4 | 28.2 | 4.53 | 97.6 |
| Co | 0.224 | 0.692 | 0.58 | 0.07 | 98.2 |
| Cu | 2.200 | 3.660 | 12.9 | 71.6 | 16.4 |
| $H_2SO_4$ | 87.2 | 1.2 | — | — | — |

The leach residence time is set according to the material to limit the leaching of copper while still maintaining high iron and nickel recoveries. Leach residence times of between 5 and 10 hours are required. The optimum leach residence time was exceeded in the test above, such that some copper leaching was observed.

The residue from the atmospheric leach is then subjected to a two-stadium pressure leach to remove all the copper and the residual iron and nickel in the presence of sulphuric acid. The pressure leach was tested in laboratory-scale batch autoclaves. The pressure leach operates at temperatures between 110° C. and 170° C. with no oxygen in the first stadium and 0.1 to 6 bar oxygen in the second stadium. Residence times of 60 to 180 minutes are required in the first stadium and 5 to 60 minutes in the second stadium. The pressure leach residue contains high levels of PGMs and is suitable for further processing. PGM loss to the leach liquor can be minimised to less than 5% while achieving a PGM concentrate of greater than 60% precious metals. The composition (mass %) of the PGM concentrate produced from pressure leaching of the atmospheric leach residue is shown below.

| PGM + Au | Pt | Pd | Rh | Ru | Ir | Au |
|---|---|---|---|---|---|---|
| 61.4 | 34.6 | 12.7 | 4.3 | 7.7 | 1.67 | 0.61 |

| Fe | Ni | Cu | Si | Cr | Se | Te | S | C | As |
|---|---|---|---|---|---|---|---|---|---|
| 3.6 | 0.27 | 3.3 | 1.75 | 2.5 | 0.016 | 0.007 | 2.0 | 0.92 | 0.49 |

The composition of the pressure leach liquor is shown below.

| Pt Ppm | Pd ppm | Rh ppm | Ru ppm | Ir ppm | Au ppm | Fe g/L | Ni g/L | Cu g/L |
|---|---|---|---|---|---|---|---|---|
| <1 | 16.5 | 8.3 | 7 | 2.1 | <0.5 | 2 | 1.8 | 40 |

The solution from the atmospheric and pressure leach is treated in pressure vessels to oxidise the iron and precipitate it as hematite. Acid is produced during the hematite precipitation, and the bulk of the solution following the hematite precipitation from the atmospheric leach liquor is recycled back to the leach. Batch hematite precipitation tests were performed on a laboratory scale to test the removal of iron from the atmospheric leach liquor. The pressure oxidation operates at temperatures between 140° C. and 200° C., with oxygen overpressures of 1 to 10 bar. The performance of the laboratory-scale batch pressure oxidation is summarised below.

| Feed Composition, g/L | | Fe removal (solid basis) | Ni Loss (solid basis) | [Fe] in Filtrate | [H$_2$SO$_4$] in |
|---|---|---|---|---|---|
| Fe$^{2+}$ | Ni | % | % | g/L | Filtrate g/L |
| 24 | 100 | 88.9 | 0.38 | 2.6 | 35.9 |
| 35 | 95 | 80.5 | 0.41 | 6.67 | 47.4 |

A bleed stream is taken from the solution following hematite precipitation. This bleed is neutralised with lime and any residual iron is precipitated as goethite. The neutral solution is then crystallised to produce nickel sulphate. The gypsum/goethite residue is disposed of.

The copper sulphate solution from the pressure leach is also treated in a pressure vessel to remove iron as hematite. Selenium is removed in an additional unit operation to produce a purified solution from which copper is electro-won. The spent copper electrolyte is recycled back to the atmosphere and pressure leaches to utilise the acid generated during electrowinning. The copper in the solution is cemented as copper metal and aids in the leaching of the iron and nickel.

EXAMPLE 4

FIG. 9

In this variation the first leach (at ambient and/or elevated pressure) is operated so as to dissolve only nickel and cobalt. The iron and copper are dissolved and then re-precipitated as goethite and antlerite, respectively. This requires an alloy that is reactive enough to raise the pH of the leach solution sufficiently for the copper to hydrolyse and precipitate as antlerite. The solution proceeds to nickel/cobalt recovery. The goethite/antlerite is re-leached to selectively dissolve the antlerite without co-dissolving more than a small part of the goethite. The copper-rich solution is passed to copper electrowinning, and the spent electrolyte returned to dissolve more antlerite. The remaining goethite is then redissolved under more aggressive conditions, leaving the PGMs as a concentrate that is sent to a PGM refinery. The solution leaving the goethite dissolution stage is passed to a high-temperature autoclave to precipitate the iron as hematite and regenerate acid for recycle to the goethite dissolution stage.

EXAMPLE 5

FIG. 10

This is similar to Example 4, but in this case no PGMs are present, therefore the goethite re-dissolution stage is omitted because it is not needed.

Test Results

Nickel

Using a DC arc furnace with an internal diameter of 1.0 m, connected to a 5.6 MVA power supply, approximately 26 tons of calcine ('dead-roasted' concentrate) was processed over a period of 9 days, during which time 83 slag taps were carried out. The metallurgical data presented here is a weighted-averaged summary of the operation during 22 taps under the preferred conditions for producing good metallurgical performance, i.e. just over a quarter of the campaign. These taps cover a wide range of operating conditions, but the overall average is considered representative of the steady operation of the furnace during this campaign.

The anthracite addition was approximately 12% based on the mass of calcine fed. (Actual additions were 12.7%, 11.6%, and 12.0% during the three periods summarised here.) Metal was produced at a rate of 250 kg per ton of calcine fed.

Typical operating conditions included feedrates of around 220 kg/h of calcine, power levels around 300 kW (including losses of about 150 kW), voltages between 175 and 250 V, and total power fluxes around 400 to 500 kW/m$^2$. The energy requirement of the process was 760 kWh/t of calcine, excluding losses from the furnace.

Slag Composition During Taps of Good Metallurgical Operation (Mass %)

| Taps | Temp ° C. | Al$_2$O$_3$ | CaO | Co | Cr$_2$O$_3$ | Cu | FeO | MgO | Ni | SiO$_2$ | Fe/SiO$_2$ |
|---|---|---|---|---|---|---|---|---|---|---|---|
| 40–46 | 1481 | 6.50 | 2.85 | 0.11 | 1.23 | 0.46 | 47.33 | 8.52 | 0.26 | 32.78 | 1.12 |
| 49–56 | 1483 | 9.18 | 2.58 | 0.13 | 1.23 | 0.51 | 48.29 | 6.22 | 0.33 | 31.57 | 1.19 |
| 63–69 | 1505 | 7.79 | 2.42 | 0.13 | 1.51 | 0.48 | 47.14 | 5.98 | 0.29 | 33.31 | 1.10 |
| Overall | 1489 | 7.84 | 2.62 | 0.12 | 1.31 | 0.49 | 47.61 | 6.94 | 0.29 | 32.51 | 1.14 |

Metal Composition During Taps of Good Metallurgical Operation (Mass %)

| Taps | Temp ° C. | Co | Cr | Cu | Fe | Ni | S | Si |
|---|---|---|---|---|---|---|---|---|
| 40–46 | 1470 | 1.37 | 0.05 | 19 | 33 | 42 | 1.3 | 0.05 |
| 49–56 | 1450 | 1.47 | 0.05 | 19 | 32 | 44 | 1.3 | 0.06 |
| 63–69 | 1450 | 1.60 | 0.05 | 19 | 33 | 42 | 1.4 | 0.06 |

Representative Compositions of Calcine, Slag, and Metal (Mass %)

|  | Calcine | Slag | Metal |
|---|---|---|---|
| $Al_2O_3$ | 3.07 | 7.84 | — |
| CaO | 1.43 | 2.62 | — |
| Co | (0.46) | (0.12) | 1.5 |
| CoO | 0.59 | 0.16 | — |
| Cr | — | — | 0.05 |
| $Cr_2O_3$ | 0.07 | 1.31 | — |
| Cu | (5.21) | (0.49) | 19 |
| $Cu_2O$ | 5.87 | — | — |
| CuO | (6.52) | 0.61 | — |
| Fe | (32.36) | (37.01) | 33 |
| $Fe_2O_3$ | 46.27 | — | — |
| FeO | (41.63) | 47.61 | — |
| MgO | 1.78 | 6.94 | — |
| Ni | (11.36) | (0.29) | 43 |
| NiO | 14.45 | 0.37 | — |
| S | 0.78 | — | 1.4 |
| Si | — | — | 0.06 |
| $SiO_2$ | 20.38 | 32.51 | — |
| Total | 95.4 | 100.0 | 98.0 |
| $Fe/SiO_2$ | 1.59 | 1.14 | — |

Recoveries

The recoveries of the valuable elements were calculated based on the following analyses. The rest of the compositions and flowrates were calculated on the basis of these numbers.

|  | Typical | Best |
|---|---|---|
| % Co in slag | 0.12 | 0.09 |
| % Cu in slag | 0.49 | 0.43 |
| % Ni in slag | 0.29 | 0.20 |
| % Fe in metal | 33 | 33 |

The actual recoveries obtained on this campaign were calculated using both the typical and the best analyses obtained.

|  | Typical | Best |
|---|---|---|
| Co recovery, % | 83 | 87 |
| Cu recovery, % | 94 | 95 |
| Fe recovery, % | 25 | 25 |
| Ni recovery, % | 98.3 | 98.9 |

PGM ConRoast

Approximately 30 tons of PGM-bearing sulphide ore concentrate was treated in a fluidized-bed reactor, then smelted in a pilot-scale DC arc furnace. The resulting alloy was refined using a blowing operation, then treated hydrometallurgically to produce a high-grade PGM concentrate.

The fluidized bed was operated at approximately 1000° C., and the concentrate was fed at about 140 kg/h. Gas velocities of about 0.4 m/s were used. The residence time was rather low, at approximately 20 seconds per pass. Most of the material underwent two passes through the reactor, with a small quantity passing through three times. The sulphur level decreased from 4.55% S to 0.5% after the first pass (96% elimination of S), and to 0.24% after the second pass (98% elimination), and to 0.13% S after the third pass. During roasting, the impurities were diminished as follows:

S from 4.55% to 0.24% (to 0.13%)

As from 40 to 21 ppm

Se from 60 to 8.8 ppm

Te from 10 to 7.8 ppm

Os from 5.5 to 3.8 g/t

Smelting was carried out in a pilot-scale DC arc furnace. 24 tons of (mostly double pass) dead-roasted concentrate (including 1 ton of triple-roasted material) was processed in a week-long campaign. The furnace was operated at a power level of 300 to 500 kW, which translates to a power flux of 290 to 480 kW/m$^2$. The average operating temperature was 1650° C. Calcine was fed to the furnace at feedrates of 200 to 300 kg/h, and approximately 5% coke addition was used. No additional fluxes were added. An energy requirement of 650 kWh/t of calcine was required (neglecting energy losses from the furnace shell). (Obviously in a full-scale plant operating with hot feeding of calcine to the furnace, this figure would be less.) The process was operated consistently with less than 1 g/t PGM in slag, and values as low as 0.3 g/t in the slag were demonstrated. The average PGM loss to the slag over the entire campaign was 2.9 g/t.

The analyses of the original concentrate, roasted concentrate, and slag are shown below (mass %).

|  | $Al_2O_3$ | C | CaO | Co | $Cr_2O_3$ | Cu |
|---|---|---|---|---|---|---|
| Original concentrate | 4.2 | — | 4.4 | 0.06 | 2.6 | 1.04 |
| Roasted concentrate | 5.4 | 0.09 | 4.3 | 0.06 | 2.7 | 1.01 |
| Slag | 7.1 | 0.03 | 5.2 | 0.07 | 2.8 | 0.13 |

|  | FeO | MgO | Ni | S | $SiO_2$ | PGM, g/t |
|---|---|---|---|---|---|---|
| Original concentrate | 16.4 | 20.4 | 1.91 | 4.55 | 42.6 | 308 |
| Roasted concentrate | 16.3 | 19.9 | 1.84 | 0.25 | 43.3 | 296 |
| Slag | 7.2 | 24.7 | 0.10 | 0.07 | 51.0 | 2.9 |

Impurity removal overall (including roasting and smelting) is shown below, as a percentage of the amount originally present in the unroasted concentrate.

Impurity removal in roasting and smelting, % of element in feed

| As | Bi | Mn | Pb | Se | Te | V |
|---|---|---|---|---|---|---|
| 70 | 87 | 95 | 100 | 95 | 84 | 77 |

Approximately 109 kg of alloy per ton of roasted concentrate was produced in the furnace. Over the campaign, about 2.6 tons of alloy was produced in total. Most of the alloy was tapped in two large batches. (The first alloy tap was diluted somewhat by the initial metal heel in the furnace.) Shown below is the composition of the alloy, together with the composition of the alloy produced in a laboratory-scale preliminary test (all in mass %). Also shown is the composition of the refined alloy produced by blowing the molten alloy with air, as discussed below.

|  | C | Co | Cr | Cu | Fe | Ni | S | Si | PGM |
|---|---|---|---|---|---|---|---|---|---|
| Small-scale test | 0.05 | 0.55 | 0.27 | 9.81 | 70.6 | 17.1 | 2.00 | <0.05 | 0.2804 |
| 836 kg alloy | 1.06 | 0.33 | 3.35 | 7.56 | 67.7 | 16.6 | 0.48 | 1.34 | 0.1700 |
| 1612 kg alloy | 0.97 | 0.50 | 2.35 | 7.43 | 71.1 | 15.3 | 0.97 | 1.05 | 0.2646 |
| Refined alloy | 0.04 | 0.6 | 0.03 | 13 | 60 | 24 | 0.4 | <0.05 | 0.2609 |

The alloys produced during the furnace campaign had the following ranges of composition.

C: 0.6–1.1%

Cr: 1.6–3.35%

Si: 0.76–1.34%

The alloy with the worst composition (i.e. from the 836 kg batch) was selected to demonstrate the downstream process on the most conservative basis. In order to lower the quantities of carbon and silicon (and chromium) prior to leaching, it was necessary to blow air into the molten alloy (using a top-blown rotary converter, to simulate the operation of the proposed ladle furnace to be used for this operation). The composition of the resulting refined alloy is shown in the table above. This alloy was water-atomized to a particle size less than 100 μm. The atomized alloy was then used for the leaching tests.

After hydrometallurgical processing, a final PGM concentrate was produced with the composition below (mass %).

| PGM + Au | Pt | Pd | Rh | Ru | Ir | Au |
|---|---|---|---|---|---|---|
| 61.4 | 34.6 | 12.7 | 4.3 | 7.7 | 1.67 | 0.61 |

| Fe | Ni | Cu | Si | Cr | Se | Te | S | C | As |
|---|---|---|---|---|---|---|---|---|---|
| 3.6 | 0.27 | 3.3 | 1.75 | 2.5 | 0.016 | 0.007 | 2.0 | 0.92 | 0.49 |

MatteRoast

Small-scale laboratory tests were carried out on PGM-containing furnace matte. The matte was either milled as a solid, or water-atomized from the liquid state, then dead-roasted in either a fluidized bed or a rotary kiln. (No difference was found between the roasting behaviour of the milled and the atomized matte.) It was shown that matte can be roasted to extremely low levels of sulphur. The dead-roasted matte was then smelted in a two-stage process. The first-stage of smelting produces a small quantity of copper-nickel alloy that contains almost no iron or sulphur. The PGMs essentially all report to the copper-nickel alloy. The first-stage alloy has a PGM content around 2%. (This can be upgraded by leaching the Cu and Ni to produce a PGM concentrate.) The slag from the first stage is then smelted, using a carbonaceous reductant, to produce a second alloy containing most of the remaining base metals, as well as the residual precious metals.

Small-scale fluidized-bed roasting tests were carried out on 20 g samples in a 25 mm silica tube fluidized bed. Successful roasting was achieved using a particle size range of 250–300 μm, and a temperature of 800–850° C. The sulphur content of the matte decreased from 28.7% to 0.03% in 3 hours. Good results were also obtained after 1.5 hours at 950° C. Temperatures above 900° C. are recommended for complete desulphurization. In order to provide larger samples for smelting tests further roasting was carried out in a laboratory-scale rotary kiln. A 20 kg sample of furnace matte was crushed to a 100–600 μm particle size range. The roasting was accomplished in 4 days of operation, with 9 passes of 12 hours each, with a stepped increase in temperature from 675° C. to 1000° C. over this period. The sulphur content of this material decreased from 26.7% to 0.04% by mass. A mass balance shows that 1. kg of dead-roasted matte is produced from 1.05 kg of furnace matte as originally supplied. During roasting, the impurities were diminished as follows: S from 27.4% to 0.035%; Se from 244 ppm to 14 ppm; Te from 96 ppm to 32 ppm; and As from 54 ppm to 46 ppm. There is no significant loss of PGMs, except for some Os.

A crucible test in a laboratory-scale furnace was performed using a feed comprising 1050 g of dead-roasted furnace matte (derived from 1098 g of unroasted furnace matte), 450 g of silica, and 31.5 g of carbon. This produced 1517 g of slag, and 38 g of a copper-nickel alloy containing the vast majority of the precious metals. The metal button that was produced was equivalent in mass to 12% of the Cu—Ni content of the original furnace matte. This alloy quantity is comparable to the amount of PGM-containing alloy produced in the traditional slow-cooling process. The recovery of the precious metals was 99.0%, expressed as (PGM+Au in alloy)/(PGM+Au in alloy and slag).

|  | Cu | Ni | Co | S | Fe | FeO | SiO$_2$ | PGM, g/t |
|---|---|---|---|---|---|---|---|---|
| Furnace matte | 10.2 | 17.6 | 0.66 | 27.4 | 39.8 | — | — | 762 |
| Roasted matte | 10.7 | 18.1 | 0.68 | 0.035 | 41.9 | — | — | 801 |
| First-stage alloy | 65.3 | 31.1 | 0.048 | 0.37 | <0.2 | — | — | 19815 |
| First-stage slag | 5.55 | 11.7 | 0.42 | 0.006 | — | 37.3 | 29.2 | 5.2 |

It is clearly quite possible to treat the slag from the first smelting stage according to standard slag-cleaning practice in a DC arc furnace. Very high recoveries of the base metals and the residual precious metals would be expected in the second-stage collection.

Zinc

Calcined zinc concentrate was fed, together with coke as a reductant, to a pilot-scale DC arc furnace, fuming off zinc vapour. (Other works, has demonstrated the production of Prime Westem grade zinc by further treatment of the zinc vapour in a lead splash condenser. It is also possible to use distillation to refine this zinc even further.)

A total of 56 tons of calcine was processed during the test work, with coke and lime additions averaging approximately 13% and 3%, respectively. Approximately 16 tons of discard slag and 38 tons of zinc oxide-rich bag-plant dust (fume) was produced by operating the DC arc furnace at a power level between 500 and 700 kW. In this series of tests, the zinc vapour leaving the furnace was combusted with air and collected in a bag plant. The feed materials included unagglomerated calcine, pellets dried to 150° C., pellets dried to 350° C., and pellets indurated at 1300° C. The sulphur content of the feed materials varied between 1 and 2.4%.

The addition of between 12 and 13% coke resulted in an overall zinc extraction efficiency of 95.4%. Fuming rates of up to 170 kg Zn/h per m² of bath area were obtained. (In the case of feeding unagglomerated calcine, a zinc extraction efficiency of 98.7% was obtained, and the average zinc fuming rate was 164 kg/h·m².)

The specific energy requirement was found to be approximately 1.17 MWh/ton feed at an average operating temperature of 1490° C. Iron production varied between 2 and 21 kg per ton of calcine.

The fume produced during the test work was of an even better quality than that for previous test work during which the condenser was successfully coupled to the furnace. The ratio of CaO, MgO, $SiO_2$, and FeO to ZnO was found to be approximately 0.04 in this test work, compared to a value of 0.14 found previously. Therefore it is reasonable to expect good condenser performance.

References

1. H Fabian, Copper, Ullmann's Encyclopedia of Industrial Chemistry, Fifth Edition, Vol.A7, VCH Vertagsgesellschaft mbH, New York, 1986, pp.471–523.
2. R W Bartlett, R J McClincy, & R J Wesely, Smelting copper without converters, JOM, Vol.37, No.5, May 1985, pp.17–19.
3. R R Odle, A E Morris, & R J McClincy, Investigation of direct smelting of copper concentrates, in Advances in Sulfide Smelting, Met. Society of AIME, Warrendale, Pa., Vol.1, 1983, pp.57–72.
4. McClincy, C Arentzen, & R J Wesely, Commercial implications of direct copper smelting, in Advances in Sulfide Smelting, Met. Society of AIME, Warrendale, Pa., Vol.2, 1983, pp.449–511.
5. C Arentzen, T G Fulmor, & F L Holderreed, Electric furnace smelting of copper concentrates, U.S. Pat. No. 3,351,462, November 1967.
6. W R Opie, Pyrometallurgical processes that produce blister grade copper without matte smelting, in Extraction Metallurgy 81, IMM, London, Sept. 21–23, 1981, pp.137–140.
7. Rajcevic, et al., Production of blister copper directly from dead roasted-copper-iron concentrates using a shallow bed reactor, U.S. Pat. No. 4,006,010, issued February 1977.
8. Barth, Handbuch der Technischen Electrochemie, G Eger Editor, Vol.4, Part 3A, Akademische, 1956.
9. Barth, Electric smelting of sulphide ores, in Extractive Metallurgy of Copper, Nickel and Cobalt, P Queneau (Editor), International Symposium AIME, Interscience Publishers, New York, Feb. 15–18, 1960, pp.255–257.
10. P Kettner, C A Maelzer, & W H Schwartz, The Brixlegg electro-smelting process applied to copper concentrates, AIME Annual Meeting, San Francisco, February 1972.
11. P Kettner, C A Maelzer, &W H Schwartz, AIME paper, 1974, A74–16.
12. W H Schwartz, Comparison of capital and operating costs of current copper recovery processes, Lurgichemie, Frankfurt A/M, Ma. 15, 1973.
13. W Schwartz, An investigation into comparative values for investment and operating costs of thermal processes for copper extraction, (translated into English from the original German), Erzmetall, Vol.28, No.11, 1975, pp.501–505.
14. D L Paulson, R B Worthington, & W L Hunter, Production of blister copper by electric furnace smelting of dead-burned copper sulphide concentrates, US Bureau of Mines, RI-8131, 1976.
15. J E Hoffmann & K N Subramian, Exxon Research and Engineering Co., Dead roast—oxide flash reduction process for copper concentrates, U.S. Pat. No. 4,421,552, filed Apr. 16, 1982, issued Dec. 20, 1983.
16. Dead roast—shaft furnace copper smelting, World Mining, Vol.33, No.12, November 1980, pp.40–41.
17. A L McKague, G E Norman, & J F Jackson, Falconbridge Nickel Mines Limited's new smelting process, CIM Bulletin, Vol.738, No.818, June 1980, pp.132–141.
18. R P Mahant, Pilot plant investigations into roasting and electric furnace smelting at Falconbridge Limited, CIM Bulletin, Vol.77, No.866, June 1984, pp.79–85.
19. R R Hoffman & G H Kaiura, Smelting process update at Falconbridge Limited—Sudbury operations, $114^{th}$ TMS-AIME Annual Meeting, New York, February 1985.
20. M Scales, Smelter modernization, Canadian Mining Journal, Vol.107, No.5, May 1986, pp.44–50.
21. Falconbridge's countdown on acid rain, Canadian Mining Journal, Vol.110, No.2, February 1989, pp.23–29 (especially p.24)
22. D P Briand, Smelter operations at Falconbridge Limited, Sudbury, In: Extractive metallurgy of copper, nickel and cobalt. Proceedings of the Paul E. Queneau International Symposium, Feb. 21–25, 1993: Volume II: Copper and nickel smelter operations. C A Landolt, ed. Warrendale Pa.: The Minerals, Metals and Materials Society, 1993, Vol.11, p.1581.
23. N Stubina, J Chao, & C Tan, Recent electric furnace developments at Falconbridge (Sudbury Operations), CIM Bulletin, Vol.87, No.981, June 1994, pp.57–61.
24. Falconbridge Annual Report, 1998.
25. C E O'Neill, Inco Ltd, Reduction smelting process, U.S. Pat. No. 4,344,792, Filed Feb. 26, 1981, Issued Aug. 17, 1982.
26. M Pabst, Thompson prepares for smelter test, Canadian Mining Journal, Vol.101, No.11, November 1980, pp.52–57.
27. C Diaz, B R Conard, C E O'Neill, & A D Dalvi, Inco roast-reduction smelting of nickel concentrate, in Extractive metallurgy of copper, nickel and cobalt, Proceedings of the Paul E. Queneau International Symposium, Feb. 21–25, 1993, R G Reddy and R N Weizenbach, editors, Warrendale, Pa., The Minerals, Metals, and Materials Society, Volume I, pp.583–599.
28. C Diaz, B R Conard, C E O'Neill, & A D Dalvi, Inco roast-reduction smelting of nickel concentrate, CIM Bulletin, Vol.87, No.981, June 1994, pp.62–71.
29. C Diaz, B R Conard, S W Marcuson, & K I Burgess, Deep roasting of nickel concentrate, CIM Bulletin, Vol.87, No.981, June 1994, pp.72–78.
30. D G E Kerfoot, Nickel, Ullmann's Encyclopedia of Industrial Chemistry, Fifth Edition, Vol.A17, VCH Verlagsgesellschaft mbH, New York, 1986, pp.157–219.
31. E G Baglin, J M Gomes, T G Camahan, & J M Snider, Recovery of platinum, palladium, and gold from Stillwater Complex flotation concentrate by a roasting-leaching procedure, Complex Sulfides—Processing of ores, concentrates and by-products, San Diego, Calif., Nov. 10–13, 1985, TMS, Warrendale, Pa., pp.167–179.
32. C D McDoulett Jr & G W Reschke, Metal leaching and recovery process, U.S. Pat. No. 5,364,444, Jul. 8, 1993, Nov. 15, 1994.
33. S Duyvesteyn, H Liu, & W P C Duyvesteyn, Recovery of platinum group metals from oxide ores—TML process, Hydrometallurgy '94, Cambridge, UK, Jul. 11–15, 1994, Chapman & Hall, London, pp.887–912.

34. Peng Rongqui & Cai Chuansuan, Treatment of complex sulphide concentrate containing copper, zinc, and lead (in Chinese), J. Cent. South Inst. Min. Metall. China, No.4, 1981, pp.31–37.

35. A F S Schoukens, G M Denton, & R T Jones, Pilot-plant production of Prime Western grade zinc from lead blast-furnace slags using the Enviroplas process, Third International Symposium on Recycling of Metal and Engineered Materials, Point Clear, Ala., Nov. 12–16, 1995, TMS Fall Extraction and Processing Meeting, pp.857–868.

What is claimed is:

1. A process for treating a metal sulfide concentrate which includes at least one metal selected from the group consisting of the PGMs, nickel, cobalt and zinc, the method comprising the steps of:

dead-roasting the metal sulfide concentrate, smelting the dead-roasted concentrate under reducing conditions in an electrically stabilized open-arc furnace, and collecting any metals from the smelting step in the form of an alloy or vapor.

2. The process of claim 1 further comprising the step of: implementing the dead-roasting step to produce a steady stream of $SO_2$-bearing gas.

3. The process of claim 2 further comprising the step of: using the $SO_2$-bearing gas from the dead-roasting step as a feedstock in a sulfuric acid plant.

4. The process of claim 3 further comprising the step of: scrubbing and neutralizing the $SO_2$-bearing gas produced by the dead-roasting step.

5. The process of any of claims 2–4 further comprising the step of:

performing the dead-roasting step in an enclosed vessel to avoid unwanted dilution by air of $SO_2$.

6. The process of claim 5 further comprising the step of: conducting the dead-roasting step in a fluidized bed reactor.

7. The process of claim 1 further comprising the step of: introducing coke in the smelting step to achieve said reducing conditions.

8. The process of claim 1 wherein the concentrate includes zinc and which further comprises the steps of:

releasing zinc from the metal sulfide concentrate during the dead-roasting step, melting the released zinc under the reducing conditions of the smelting step to form a zinc metal vapor, fuming off the zinc metal vapor in a gas stream, and recovering the zinc metal by condensation of the gas stream.

9. The process of claim 8 further comprising the step of: agglomerating the zinc released during the releasing step to form a concentrate before smelting the dead-roasted concentrate.

10. The process of claim 1 further comprising the step of: using a PGM concentrate for said metal sulfide concentrate.

11. The process of claim 10 further comprising the step of: using a green furnace matte for said PGM concentrate.

12. The process of claim 1 wherein the concentrate includes iron and which further comprises the step of: removing iron in oxide form from said alloy.

13. The process of claim 1 wherein the feed to the furnace includes at least one member selected from the group consisting of carbon, silicon and chromium, and which further comprises the step of:

removing said at least one member selected from the group consisting of carbon, silicon and chromium from said alloy.

14. The process of claim 13 further comprising the step of: performing the removing step in a converter.

15. The process of claim 14 further comprising the step of: atomizing alloy from the converter in a form that is suitable for subsequent hydrometallurgical recovery of metal.

16. The process of claim 1 wherein the smelting step comprises:

a two-stage reduction smelting process.

17. The process of claim 16 further comprising the steps of:

operating a furnace under slightly reducing conditions in a first stage, and operating said electrically stabilized open arc furnace under highly reducing conditions in a second stage.

18. The process of claim 17 wherein the concentrate includes iron and which further comprises the steps of:

producing in the second stage an iron-based alloy, atomizing the iron-based alloy, and subjecting the atomized alloy to hydrometallurgical treatment.

19. The process of any of claims 16–18 wherein the concentrate contains copper and nickel and wherein the first stage comprises the steps of:

producing a copper/nickel alloy, forming particles of the copper/nickel alloy by at least one of water atomization, granulation, or crushing and milling, and subjecting the particles of copper/nickel alloy to hydrometallurgical treatment.

* * * * *